(12) United States Patent
Lu et al.

(10) Patent No.: US 11,915,130 B2
(45) Date of Patent: Feb. 27, 2024

(54) MITIGATING DELUSIONAL BIAS IN DEEP Q-LEARNING FOR ROBOTIC AND/OR OTHER AGENTS

(71) Applicant: Google LLC, Mountain View, CA (US)

(72) Inventors: Tyler Lu, Mountain View, CA (US); Boon Teik Ooi, Mountain View, CA (US); Craig Boutilier, Palo Alto, CA (US); Dale Schuurmans, Mountain View, CA (US); DiJia Su, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 607 days.

(21) Appl. No.: 17/033,144

(22) Filed: Sep. 25, 2020

(65) Prior Publication Data

US 2022/0101111 A1  Mar. 31, 2022

(51) Int. Cl.
  *G06N 3/08* (2023.01)
  *G06N 3/008* (2023.01)
  *G06N 3/04* (2023.01)

(52) U.S. Cl.
  CPC .............. *G06N 3/08* (2013.01); *G06N 3/008* (2013.01); *G06N 3/04* (2013.01)

(58) Field of Classification Search
  None
  See application file for complete search history.

(56) References Cited

PUBLICATIONS

Su et al., ConQUR: Mitigating Delusional Bias in Deep Q-learning, arXiv:2002.12399v1 [cs.LG] Feb. 27, 2020; Total pp. 21 (Year : 2020).*
Lu et al., Non-delusional Q-learning and Value Iteration, 32nd Conference on Neural Information Processing Systems (NeurIPS 2018), Montréal, Canada; Total pp. 11 (Year: 2018).*
Baird, Leemon; Residual algorithms: Reinforcement learning with function approximation. In Proceedings of the International Conference on Machine Learning; 9 pages; dated 1995.
Bartlett, Peter L. et al.; Nearly-tight VC-dimension and pseudodimension bounds for piecewise linear neural hetworks; arXiv:1703.02930; p. 1-17; dated 2017.
Bellemare, Marc G. et al.; A Distributional Perspective on Reinforcement Learning; 19 pages; dated Jul. 21, 2017.
Bellemare, Marc G. et al.; Increasing the Action Gap: New Operators for Reinforcement Learning; Google DeepMind; 14 pages; dated Dec. 15, 2015.
Bellemare, Marc G. et al.; The Arcade Learning Environment: An Evaluation Platform for General Agents; Journal of Artificial Intelligence Research; p. 253-279; dated Jun. 2013.
Bertsekas, Dimitri P.; Neuro-Dynamic Programming: An Overview; Laboratory for Information and Decision Systems; pp. 92-96; dated 1995.

(Continued)

*Primary Examiner* — Alan Chen
(74) *Attorney, Agent, or Firm* — Gray Ice Higdon

(57) ABSTRACT

Delusional bias can occur in function approximation Q-learning. Techniques for training and/or using a value network to mitigate delusional bias is disclosed herein, where the value network can be used to generate action(s) for an agent (e.g., a robot agent, a software agent, etc.). In various implementations, delusional bias can be mitigated by using a soft-consistency penalty. Additionally or alternatively, delusional bias can be mitigated by using a search framework over multiple Q-functions.

19 Claims, 10 Drawing Sheets

(56) References Cited

PUBLICATIONS

Blum, Avrim et al.; Training a 3-Node Neural Network is NP-Complete; MIT Lab. for Computer Science; pp. 494-501; dated 1989.
Boyan, Justin A.; Generalization in Reinforcement Learning: Safely Approximating the Value Function; Computer Science Department; pp. 369-376; dated 1995.
Durrett, Rick; Probability: Theory and Examples; 490 pages; dated Jan. 11, 2019.
Castro, Pablo Samuel et al; The Linear Programming Approach to Approximate Dynamic Programming; Motivation & Background Material; p. 1-29; dated Mar. 28, 2006.
Geist, Mathhieu et al.; Is the Bellman residual a bad proxy?; Advances in Neural Information Processing Systems 30; p. 1-10; dated 2017.
Gordon, Geoffrey J.; Stable Function Approximation in Dynamic Programming; School of Computer Science; 24 pages; dated Jan. 1995.
Hasselt, H. V.; Double Q-learning; Multi-agent and Adaptive Computation Group Centrum Wiskunde & Informatica; pp. 1-9; dated 2010.
Hessel, Matteo et al.; Rainbow: Combining Improvements in Deep Reinforcement Learning; DeepMind; 14 pages; dated Oct. 6, 2017.
Jiang, N. et al.; The Dependence of Effective Planning Horizon on Model Accuracy; University of Michigan; 9 pages; dated 2015.
Lehnert, Lucas et al.; On Value Function Representation of Long Horizon Problems; The Thirty-Second AAAI Conference on Artificial Intelligence; pp. 3457-3465; dated 2018.
Aei, Hamid Reza et al.; Toward Off-Policy Learning Control with Function Approximation; ICML; 8 pages; dated 2010.
Melo, Francisco S. et al; Q-learning with Linear Function Approximation; Instituto de Sistemas e Robotica; pp. 1-23; dated Mar. 2007.
Mnih, Volodymyr et al.; Human-level control through deep reinforcement learning; Letter; pp. 529-541; dated Feb. 26, 2015.
Munos, Remi; Performance Bounds in Lp norm for Approximate Value Iteration; HAL; 22 pages; dated Jan. 15, 2007.
Munos, Remi et al.; Safe and efficient off-policy reinforcement learning; NIPS; p. 1-9; dated 2016.
Nachum, Ofir et al.; Bridging the Gap Between Value and Policy Based Reinforcement Learning; NIPS; p. 1-11; dated 2017.
Petrik, Marek; Optimization-based Approximate Dynamic Programming; University of Massachusetts Amherst; 362 pages; dated Sep. 2010.
Sauer, N.; On the Density of Families of Sets; Journal of Combinatorial Theory; p. 145-147; dated 1972.
Shelah, Saharon; A Combinatorial Problem; Stability and Order for Models and Theories in Infinitary Languages; Pacific Jounal of Mathematics; vol. 41, No. 1; 19 pages; dated Nov. 1972.
Sutton, Richard S. et al.; Reinforcement Learning: An Introduction; The MIT Press; 10 pages; dated 1998.
Szepesvari, Csaba; et al.; Interpolation-based Q-learning; 8 pages; dated 2004.
Tesauro, Gerald; Practical Issues in Temporal Difference Learning; Practical Issues in Temporal Difference Learning; pp. 259-266; dated 1992.
Tsitsiklis, John N. et al.; An Analysis of Temporal-Difference Learning with Function Approximation; IEEE; vol. 42; pp. 674-690; dated May 5, 1997.
Wang, Ziyu et al.; Dueling Network Architectures for Deep Reinforcement Learning; Google DeepMind; 9 pages; dated 2016.
Watkins, Christopher; Learning from Delayed Rewards; King's College; 241 pages; dated Watkins, Christopher; Learning from Delayed Rewards; King's College; 241 pages; dated May 1989.
Watkins, Christopher; Technical Note Q-Learning; Machine Learning; pp. 279-292; dated 1992.

\* cited by examiner

MITIGATING DELUSIONAL BIAS IN DEEP Q-LEARNING FOR ROBOTIC AND/OR OTHER AGENTS

BACKGROUND

Machine learning (ML), a type of artificial intelligence, can include supervised learning, unsupervised learning, reinforcement learning, and/or additional types of learning. Supervised learning techniques can be used to train a model based on a set of training data that contains both training inputs and desired outputs. Additionally or alternatively, unsupervised learning can be used to find structure in a set of training data that contains only inputs. Reinforcement learning techniques are concerned with training a policy network, a value network, and/or some other computational representation to guide an agent (e.g., a robot agent, a software agent, etc.) to take action(s) in an environment to maximize a reward. For example, a value network can be trained to generate one or more actions for a robot agent to perform a task.

SUMMARY

Techniques disclosed herein are directed towards training a value network, using Q-learning, to mitigate delusional bias. Additional and/or alternative techniques are directed towards using a trained value network to select one or more actions for an agent based on a current state of the agent. In some implementations, delusional bias can arise in Q-learning when Q-learning updates the value of one or more state-action pairs using estimates of successor-state values that are mutually inconsistent given the policy class induced by the regressor used to represent the value network. In some implementations, delusional bias can generate unbounded approximation error, divergence, policy cycling, and/or other undesirable behavior in a value network.

Q-learning, a type of reinforcement learning, can be used to train a value network to generate action(s) for an agent under different circumstances such that the action(s) maximize a reward. For example, the value network can process the current state of an agent to generate an action, where the action transitions the agent from the current state to the next state. In some implementations, the value network can be a deep learning neural network, such as a deep Q-learning network (DQN), a double deep Q-learning network (DDQN), and/or additional deep learning networks. In some of those implementations, the deep learning network can process a given state of an agent to generate a set of Q-value-action pairs, where each pair corresponds to an action of the agent and its associated value. For example, the set of Q-value-action pairs can include only candidate actions the agent can take from the current state (i.e., the set of Q-value-action pairs exclude actions the agent is unable to take from the current state). Additionally or alternatively, the set of Q-value-action pairs can include all possible actions of the agent, even when the agent is unable to take one or more of the actions at the current state.

In some implementations, the Q-value can provide an indication of how useful a given action is in gaining some future reward. In other words, Q-learning seeks to learn a policy that maximizes the total reward. In some implementations, Q-learning techniques can include function approximation.

In some implementations, a value network can be trained to mitigate delusional bias by including a soft-consistency penalty, where the soft-consistency penalty can promote consistency of new labels with earlier policy commitments, or the consistency of new labels with prior labels used during training of the value network. For example, the soft-consistency penalty can be used to bias labels, across training batches, towards being consistent with an expressible policy. In some implementations, the soft-consistency penalty can penalize labels of actions at a given state where the labels are larger than a policy consistent action. In other words, the soft-consistency penalty can penalize labels for actions that are not consistent with the current value network. In some implementations, the soft-consistency penalty can be incorporated into a Q-learning update.

Additionally or alternatively, a value network can be trained to mitigate delusional bias using a search framework, where the search framework can track and generate multiple candidate value networks. In some implementations, one of the candidate value networks can be selected as the value network. For example, a search-tree framework can be used to track policy-consistent delusion-free Q-function(s) across one or more batches of training data. In some implementations, the search-tree framework can be searched using one or more search processes and/or procedures. For example, the search-tree framework can be searched using a depth-first search, using a breadth-first search, using a beam search, using a modified beam search, and/or using additional types of tree-traversal search(es). In some implementations, a value network can be trained to mitigate delusional bias using both a soft-consistency penalty and using a search framework.

Accordingly, various implementations set for techniques for mitigating delusional bias in function approximation Q-learning. Traditional techniques to eliminate delusional bias are computationally expensive. Additionally or alternatively, traditional techniques may fail to converge. In contrast, techniques described herein can be used to mitigate, but not necessarily eliminate, delusional bias and do so in a manner that converges and/or is computationally efficient. For example, using a search framework allows a system to generate and explore many candidate value networks, while placing constraints on the size of the search tree, which in turn can conserve system resources (e.g., memory, processor cycles, battery, etc.). As another example, the search framework and/or the soft-consistency penalty described herein can ensure convergence for various complex value networks.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
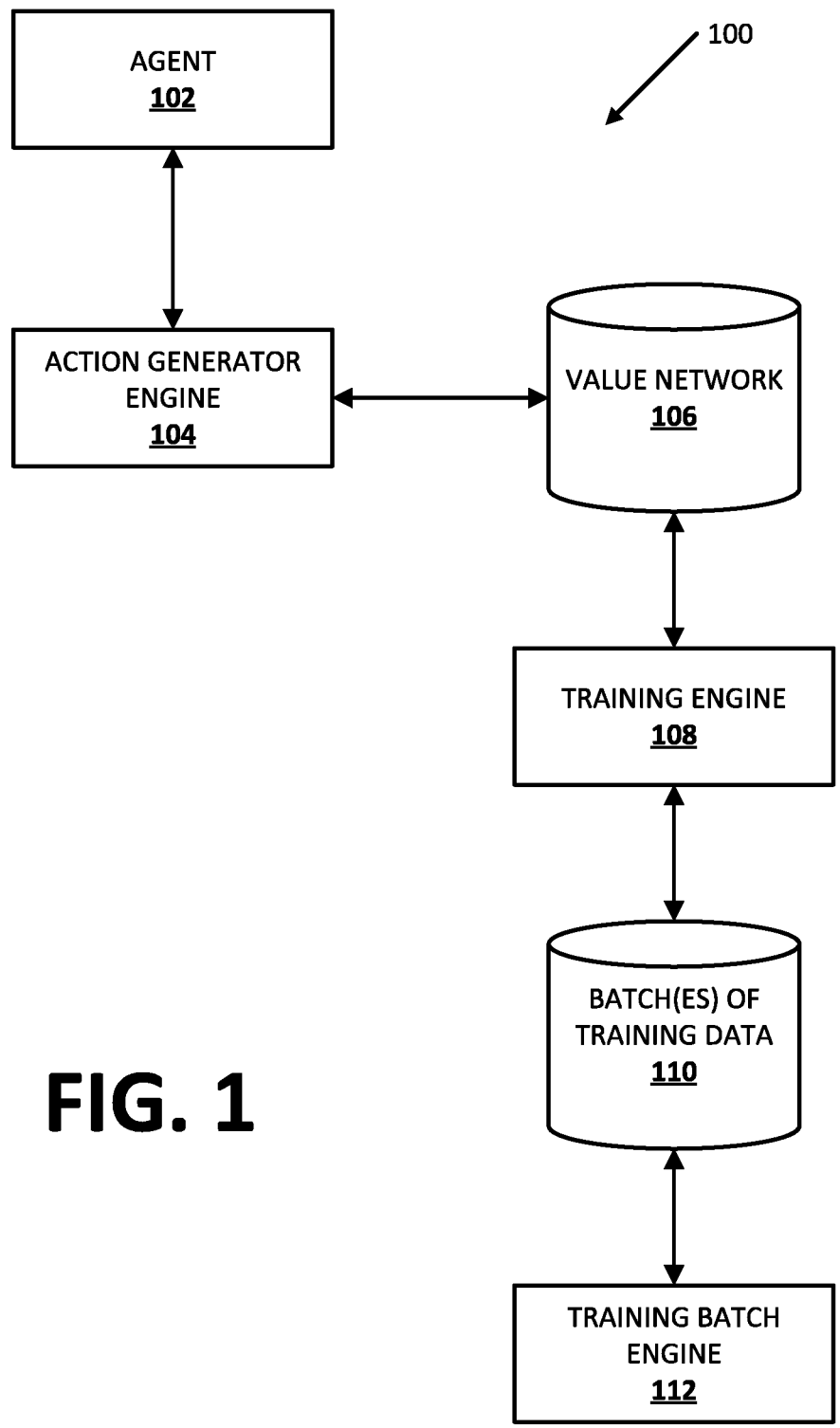
FIG. 1 illustrates an example environment in which implementations described herein may be implemented.

Delusional bias is a fundamental source of error in approximate Q-learning. Techniques described herein are directed towards efficient methods to mitigate delusional bias by training Q-regressors with labels that are "consistent" with the underlying greedy policy class. In some implementations, a simple penalization scheme can be used that encourages Q-labels used across training batches to remain (jointly) consistent with the expressible policy class. Additionally or alternatively, a search framework can be used that allows multiple Q-regressors to be generated and tracked, thus mitigating the effect of premature (implicit) policy commitments.

Q-learning lies at the heart of many of the recent successes of deep reinforcement learning (RL), with recent advancements helping to make it a widely used method in applied RL. Despite these successes, many properties of Q-learning are poorly understood, and it can be challenging to successfully apply deep Q-learning in practice. When combined with function approximation, Q-learning can become unstable. Various modifications have been proposed to improve convergence or approximation error, but it remains difficult to reliably attain both robustness and scalability.

A source of error in Q-learning with function approximation is known as delusional bias. It arises because Q-learning updates the value of state-action pairs using estimates of (sampled) successor-state values that can be mutually inconsistent given the policy class induced by the regressor. This can result in unbounded approximation error, divergence, policy cycling, and other undesirable behavior. To handle delusion, a policy-consistent backup operator that maintains multiple Q-value estimates organized into information sets can be used. Each information set has its own backed-up Q-values and corresponding "policy commitments" responsible for inducing these values. Systematic management of these sets can ensure that only consistent choices of maximizing actions are used to update Q-values. All potential solutions are tracked to prevent premature convergence on any specific policy commitments. Some of those implementations make use of tabular representations of Q-functions, so while this establishes foundations for delusional bias, the function regressor is used neither for generalization nor to manage the size of the state/action space. Consequently, this approach is not scalable to RL problems of practical size.

Techniques described herein, are directed towards CONQUR (CONsistent Q-Update Regression), a general framework for integrating policy-consistent backups with regression-based function approximation for Q-learning and for managing the search through the space of possible regressors (i.e., information sets). With suitable search heuristics, the framework can provide a computationally effective means for minimizing the effects of delusional bias in Q-learning, while allowing for the computational scaling to practical problems.

In some implementations, augmentations of standard 0-regression are used to increase the degree of policy consistency across training batches. While testing exact consistency is expensive, a soft-consistency penalty can be used that promotes consistency of new labels with earlier policy commitments. Additionally or alternatively, some implementations can use an information-set structure, where a search space over 0-regressors can be defined to allow consideration of multiple sets of policy commitments. Furthermore, in some implementations, heuristics can be used for guiding the search over 0-regressors, which can be critical given the combinatorial nature of information sets.

In some implementations, a discounted, infinite horizon Markov decision process (MDP)=(S, A, P $p_0$, R, $\gamma$) can be utilized. The state space S can reflect both discrete and continuous features of the problem under consideration, and the action space A can be finite (and practically enumerable) and can represent the actions that can be taken by a robot, software agent, or some other computational algorithm. Q-learning with a function regressor $Q_\theta$ can be used to learn an approximately optimal or optimal Q-function, drawn from some approximation class parameterized by $\Theta$ (e.g., the weights of a neural network). In some implementations, the regressor can be a deep network such as a DQN, a DDQN, and/or additional deep networks.

For online Q-learning, at a transition (s, a, r, s'), the Q-update can be given by:

$$\theta \leftarrow \theta + \alpha \left( r + \gamma \max_{a' \in A} Q_\theta(s', a') - Q_\theta(s, a,) \right) \nabla_\theta Q_\theta(s, a) \qquad (1)$$

Batch versions of Q-learning, including DQN, are similar, but a regressor can be fit repeatedly to batches of training examples. As described herein, regressor and/or Q-regressor may indicate a regressor utilized with Q-learning. Batch methods are usually more data efficient and stable than online Q-learning. Abstractly, batch Q-learning works through a sequence of (possibly randomized) data batches $D_1, \ldots, D_T$ to produce a sequence of regressors $Q_{\theta_1}, \ldots, Q_{\theta_T} = Q_\theta$, estimating the Q-function. In some implementations, a data batch is a collection of observed and/or sampled transitions of data. As an example, techniques are described herein using a straightforward form of batch Q-learning. However, this is merely an example, and techniques in accordance with some implementations can accommodate many variants, e.g., where the regressor used for bootstrapping is some earlier Q-estimator, and/or the estimators generating the max-actions and the value estimates are different as in double Q-learning.

For each (s, a, r, s')$\in D_k$, a prior estimator $Q_{\theta_{k-1}}$ can be used to bootstrap the Q-label $q = r + \gamma Q_{\theta_{k-1}}(s', a')$. In some implementations, $Q_{\theta_k}$ can be fit to this training data using a suitable regression procedure with an appropriate loss function. For example, a gradient descent loss, a mean squared error loss, a negative log likelihood loss, one or more additional or alternative loss(es), and/or combinations thereof may be utilized. Once trained, the (implicit) induced policy $\pi_9$ is the greedy policy with respect to $Q_\Theta$, i.e., $\pi_\Theta(s)=\mathrm{argmax}_{a \in A} Q_\Theta(s, a)$. In some implementations, $F(\Theta)$ can be the corresponding class of expressible Q-functions, and $G(\Theta)$ can be the corresponding respective greedy policies.

Intuitively, delusional bias can occur whenever a backed-up value estimate is derived from action choices that are not (jointly) realizable in $G(\Theta)$. Standard Q-updates can back up values for each (s, a) pair by independently choosing maximizing actions at the corresponding next states s'. However, such updates may be "inconsistent" under approximation: if no policy in $G(\Theta)$ can jointly express all past action choices, backed up values may not be realizable by any expressible policy. Delusion can manifest itself with several undesirable consequences. For example, delusional bias can prevent Q-learning from learning the optimal representable policy in $G(\Theta)$; and/or delusional bias can also cause divergence. To address this, a non-delusional policy consistent Q-learning (PCQL) algorithm has been utilized to eliminates delusion.

The first key concept in PCQL is that of policy consistency. For any $S \in S$, an action assignment $\sigma_S: S \to A$ associates an action $\sigma(s)$ with each $s \in S$. In some implementations, an action assignment a may be policy consistent if there is a greedy policy $\pi \in G(\Theta)$ such that $\pi(s)=\sigma(s)$ for all $s \in S$. In some implementations, a set SA of state-action pairs can be equated with an implied assignment $\pi(s)=a$ for all $sa \in SA$. In some implementations, SA can contain multiple pairs with the same state s, but different actions a, where SA is multi-assignment (though techniques described herein loosely use the term "assignment" in both cases, for both assignments and multi-assignments, when there is no risk of confusion).

In (batch) Q-learning, each successive regressor uses training labels generated by assuming maximizing actions (under the prior regressor) are taken at its successor states. In some implementations, $\sigma_k$ can reflect the collection of states and corresponding maximizing actions taken to generate labels for regressor $Q_{\theta_k}$ (where it can be assumed it is policy consistent). In some implementations, $Q_{\theta_k}$ can be trained by bootstrapping on $Q_{\theta_{k-1}}$ and considering a training sample (s, a, r, s'). Q-learning can generate label $r+\gamma Q_{k-1}(s', a')$ for input (s, a). However, in some implementations taking action $a^*=\mathrm{argmax}_a Q_{\theta_{k-1}}(s', a')$ at s' may not be policy consistent with $\sigma_k$. Thus Q-learning can estimate a value for (s, a) that assumes the execution of a policy that cannot be realized given the limitations of the regressor. The PCQL algorithm can prevents this by insisting that any action assignment a used to generate bootstrapped labels is consistent with earlier assignments. However, this can mean Q-labels may be generated using non-maximizing actions relative to the prior regressor.

The second key concept in PCQL is that of information sets. One will generally not be able to use maximizing actions to generate labels, so tradeoffs can be made when deciding which actions to assign to different states. Indeed, even if it is feasible to assign a maximizing action a to state s early in training, say at batch k, this may prevent assigning a maximizing a' to s' later, say at batch k+l. However, in some implementations, a different assignment to s can be considered at batch k to give more flexibility in the choice of maximizing actions at other states later. In some implementations, PCQL does not try to anticipate the tradeoffs—rather it maintains multiple information sets, each corresponding to a different assignment to the states seen in the training data so far. Each gives rise to a different Q-function estimate, resulting in multiple hypotheses. At the end of training, the best hypothesis is the one maximizing expected value with respect to an initial state distribution and/or using some other criterion for selecting among the constructed Q-function estimates or hypotheses.

PCQL can provide strong convergence guarantees, but it is a tabular algorithm: the function regressor restricts the policy class, but is not used to generalize Q-values. Furthermore, its theoretical guarantees come at a cost: it uses exact policy consistency tests. Such exact consistency tests are tractable for linear regressors, but not practical for large problems; and it maintains all consistent assignments. As a result, PCQL cannot be used for large RL problems of the type often tackled using DQN or other deep learning methods Techniques described herein are directed towards the CONQUR framework, which can be used to provide a practical approach to reducing delusion in Q-learning, specifically addressing the limitation(s) of PCQL described above. CONQUR consists of three main components: a practical soft-constraint penalty that promotes policy consistency; a search space to structure the search over multiple regressors, information sets, and/or action assignments; and heuristic search schemes (which may include expansion and/or scoring technique(s)) to find good Q-regressors.

In some implementations, a set of training data consisting of quadruples (s, a, r, s'), divided into (possibly non-disjoint) batches $D_1, \ldots D_T$ can be used for training. This perspective is quite general: online RL corresponds to $|D_i|=1$; off-line batch training (with sufficiently exploratory data) corresponds to a single batch (i.e., T=1); and/or online or batch methods with replay can be realized when the $D_i$ are generated by sampling some data source with replacement.

For any data batch D, let $\chi(D)=\{s': (s, a, r, s') \in D\}$ denote the collection of successor states of D. An action assignment $\sigma_D$ for D is an assignment (or multi-assignment) from $\chi(D)$ to A: this can dictate which action $\sigma_D(s')$ is considered "maximum" for the purpose of generating a Q-label for pair (s, a); i.e., (s, a) will be assigned training label $r+\gamma Q(s', \sigma(s'))$ rather than $r+\gamma Q(s', a')$. The set of all such assignments is $\Sigma(D)=A^{\chi(D)}$; note that the size of this set grows exponentially with $|D|$.

Given Q-function parameterization $\Theta$, $\sigma_D$ can be $\Theta$-consistent (with respect to D) if there is some $\theta \in \Theta$ such that $\pi_\theta(s')=\sigma(s')$ for all $s' \in \chi(D)$. This is simply policy consistency, but with notation that emphasizes the policy class. Let $\Sigma_\Theta(D)$ denote the set of all $\Theta$-consistent assignments over D. The union $\sigma_1 \cup \sigma_2$ of two assignments (over $D_1$, $D_2$ respectively) is defined in the usual way.

In some implementations, enforcing strict Q-consistency when the regressors $\theta_1, \theta_2, \ldots, \theta_T$ are being generated can be computationally challenging. Suppose assignments $\sigma_1, \ldots, \sigma_{k-1}$ used to generate labels for $D_1, \ldots, D_{k-1}$, are jointly $\Theta$-consistent (let $\sigma_{\leq k-1}$ denote their multi-set union). In some implementations, maintaining $\Theta$-consistency when generating $\theta_k$ can impose two requirements. First, one must generate an assignment $\sigma_k$ over $D_k$ such that $\sigma_{\leq k-1} \cup \sigma_k$ is consistent. Even testing assignment consistency can be problematic: for linear regressors this is a linear feasibility program whose constraint set grows linearly with $|D_1 \cup \ldots \cup D_k|$. For DNNs, this can be a complex, and much more expensive, polynomial program. Second, the regressor $\theta_k$ should itself be consistent with $\sigma_{\leq k-1} \cup \sigma_k$. Again, this can impose a significant constraint on the regression optimization: in the linear case, this becomes a constrained least-squares problem (solvable, e.g., as a quadratic program); while with DNNs, it could be solved, say, using a much more complicated projected SGD. However, the sheer number of constraints makes this impractical.

Rather than enforcing strict consistency, techniques described herein are directed towards a simple, computationally tractable scheme that "encourages" it: a penalty term that can be incorporated into the regression itself. In some implementations, a penalty function is added to the usual squared loss to encourage updates of the Q-regressors to be consistent with the underlying information set, i.e., the prior action assignments used to generate its labels.

When constructing $\theta_k$, let $D_{\le k} = \cup \{D_j : j \le k\}$, and $\sigma \in \Sigma_\Theta(D_{\le k})$ be the collective (possibly multi-) assignment used to generate labels for all prior regressors (including $\theta_k$ itself). The multiset of pairs $B = \{(s', \sigma(s')) | s' \in \chi(D_{\le k})\}$, is called a consistency buffer. In some implementations, the collective assignment need not be consistent, nor does the regressor $\theta_k$ need to be consistent with $\sigma$. Instead, the following soft consistency penalty can be incorporated when constructing $\theta_k$:

$$C_\theta(s', a) = \Sigma_{a \in A}[Q_\theta(s', a') - Q_\theta(s', a)]_+$$

$$C_\theta(B) = \Sigma_{(s', \sigma(s')) \in B} C_\theta(s', \sigma(s'))$$

where $[x]_+ = \max(0, x)$. This penalizes Q-values of actions at state s that are larger than that of action $\sigma(s)$. In some implementations, a is $\Theta$-consistent if and only if $C_\theta = 0$. In some implementations, this penalty can be incorporated into the regression loss for batch $D_k$:

$$L_\theta(D_k, B) = \Sigma_{(s,a,r,s') \in D_k}[r + \gamma Q_{\theta_{k-1}}(s', \sigma(s')) - Q_\theta(s,a)]^2 + \lambda C_\theta(B) \quad (2)$$

In some implementations, $Q_{\theta_k}$ is prior estimator on which labels are bootstrapped (other prior regressors may be used). The penalty effectively acts as a "regularizer" on the squared Bellman error, where A controls the degree of penalization, allowing a tradeoff between Bellman error and consistency with the action assignment used to generate labels. It thus can promote consistency without incurring the expense of testing strict consistency. In some implementations, the classical Q-learning update in equation (1) can be replaced with one using a consistency penalty:

$$\theta_k \leftarrow \theta_{k-1} + (\Sigma_{(s,a,r,s') \in D_k} \alpha[r + \gamma Q_{\theta_{k-1}}(s', \sigma(s')) - Q_\theta(s,a)] \nabla_\theta Q_\theta(s,a)) + \alpha \lambda \nabla_\theta C_\theta(B)|_{\theta = \theta_{k-1}} \quad (3)$$

This scheme is quite general. First, it is agnostic as to how the prior action assignments are made, which can be the standard maximizing action at each stage with respect to the prior regressor like in DQN, Double DQN (DDQN), and/or other deep networks. It can also be used in conjunction with a search through alternate assignments.

Second, the consistency buffer B may be populated in a variety of ways. Including all max-action choices from all past training batches promotes full consistency in an attempt to minimize delusion. However, this may be too constraining since action choices early in training are generally informed by very inaccurate value estimates. Hence, B may be implemented in other ways to focus only on more recent data (e.g., with a sliding recency window, weight decay, and/or subsampling); and the degree of recency bias may adapt during training (e.g., becoming more inclusive as training proceeds and the Q-function approaches convergence). Reducing the size of B also has various computational benefits.

Ensuring optimality requires that PCQL track all $\Theta$-consistent assignments. While the set of such assignments can be of polynomial size, it can still be impractical to track this set in realistic problems. As such, in some implementations, information set tracking can be recast as a search problem.

As described above, assume training data is divided into batches $D_1, \ldots D_T$ and some initial Q-function estimate $\theta_0$ (for bootstrapping $D_1$'s labels). The regressor $\theta_k$ for $D_k$ can, in principle, be trained with labels generated by any assignment $\sigma \in \Sigma_\Theta(D_k)$ of actions to its successor states $\chi(D_k)$, not necessarily maximizing actions with respect to $\theta_{k-1}$. Each a can give rise to a different updated Q-estimator $\theta_k$. In some implementations, there are several restrictions which could be placed on "reasonable" a-candidates: (i) $\sigma$ is $\Theta$-consistent; (ii) $\sigma$ is jointly $\Theta$-consistent with all $\sigma_j$, for $j < k$, used to construct the prior regressors on which $\theta_{k-1}$ is bootstrapped; (iii) $\sigma$ is not dominated by any $\sigma' \in \Sigma_\Theta(D_k)$, where we say $\sigma'$ dominates $\sigma$ if $Q_{\theta_{k-1}}(s', \sigma'(s')) \ge Q_{\theta_{k-1}}(s', \sigma(s'))$ for all $s' \in \chi(D)$, and this inequality is strict for at least one s'. Conditions (i) and (ii) are the strict consistency requirements of PCQL, and in some implementations, these conditions can be relaxed. Additionally or alternatively, condition (iii) is inappropriate in general, since additional assignments (e.g., to new data) may be added that render all non-dominated assignments inconsistent, requiring that reversion to some dominated assignment.

Figure 3:
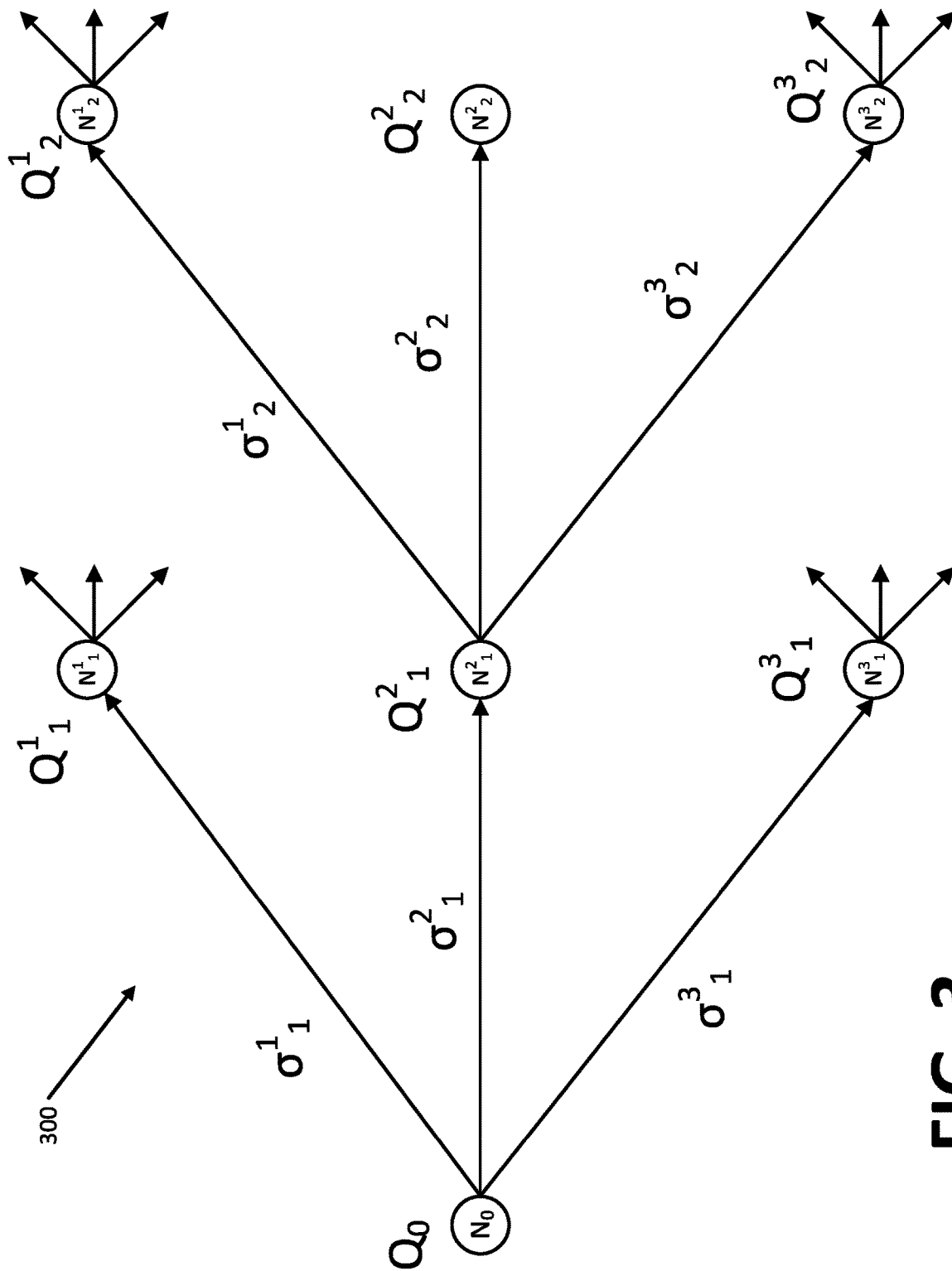
FIG. 3 illustrates an example search framework in accordance with implementations described herein.

This gives us a generic search space for finding policy-consistent, delusion-free Q-function, as illustrated in FIG. 3. Each node $n_k^i$ at depth k in the search tree is associated with a regressor $\theta_k^i$ defining $Q_{\theta_k^i}$ action assignment $\sigma_k^i$ that justifies the labels used to train $\theta_k^i$. In some implementations, $\sigma_k^i$ can also be viewed as an information set. In some implementations, a root node $n_0$ can be assumed based on an initial regression $\theta_0$, and has an empty action assignment $\sigma_0$. In some implementations, nodes at level k of the tree can be defined as follows. For each node $n_{k-1}^i$ at level k−1, with regressor $\theta_{k-1}^i$ and $\Theta$-consistent assignment $\sigma_{k-1}^i$, a child node $n_k^j$ can be generated for each $\sigma_k^j \in \Sigma_\Theta(D_k)$ such that $\sigma_{k-1}^i$ is $\Theta$-consistent. In some implementations, node $n_k^j$'s assignment is $\sigma_{k-1}^i \cup \sigma_k^j$, and its regressor $\theta_k^j$ can be trained using the following data set:

$$\{(s, a \mapsto r + \gamma Q_{\theta_{k-1}^i}(s', \sigma_k^j(s'))) : (s, a, r, s') \in D_k\}$$

In some implementations, the entire search space can be constructed in this fashion to a maximum depth of T.

Algorithm 1 below is an example of a depth-first search framework in accordance with some implementations.

Algorithm 1 CoNQUR SEARCH (Generic, depth—first)

Input: Data sets $D_k, D_{k+1}, \ldots D_T$; regressor $\hat{Q}_{k-1}$; and assignment σ over $D_{\le k-1} = \cup_{1 \le j \le k-1} D_1$ reflecting prior data; policy class $\Theta$.

1. Let $\Sigma_{\Theta, \sigma} = \{\sigma_k \in \Sigma_\Theta(D_j) : \sigma_k \cup \sigma \text{ is consistent}\}$
2. for $\sigma_k^j \in \Sigma_{\Theta, \sigma}$ do
3.    Training set S ← { }
4.    for all (s, α, r, s') ∈ $D_k$ do
5.       q ← r + $\gamma \hat{Q}_{k-1}(s', \sigma_k^j(s'))$
6.       S ← S ∪ {((s, α), q)}
7.    end for
8.    Train $\hat{Q}_k^j$ using training set S
9.    if k = T then
10.       Return $\hat{Q}_k^j$ // terminate

```
11.     else
12.         Return SEARCH (D_{k+1}, ... D_T; Q̂_k^j; σ_k^j ∪ σ; Θ) // recurse
13.     end if
14. end for
```
In some implementations, the exponential branching factor in this search tree can make complete search intractable; however, since only Θ-consistent "collective" assignments are allowed, the size of the tree can be bound-it is polynomial in the VC-dimension of the regressor.

Theorem 1. The number of nodes in the search tree is no more than $$O\left(mn \cdot \left[\frac{m}{2}\right]^{VCDim(\mathcal{G})}\right)$$

where VCDim(·) is the VC-dimension of a set of boolean-valued functions, and $\mathcal{G}$ is the set of boolean functions defining all feasible greedy policies under Θ:

$$\mathcal{G} = \{g_\theta(s,a,a') := 1[f_\theta(s,a') - f_\theta(s,a') > 0], \forall s, a \neq a' | \theta \in \Theta\} \quad (4)$$

A linear regressor with a fixed set of d features can induce a policy-indicator function class $\mathcal{G}$ with VC-dimension d, making the search tree polynomial in the size of the MDP. Additionally or alternatively, a fixed ReLU DNN architecture with W weights and L layers can have a VC-dimension of size O(WL log W) again rendering the tree polynomially sized.

Even with this bound, navigating the search space exhaustively can be impractical. Instead, in some implementations, various search methods can be used to explore the space, with the aim of reaching a "high quality" regressor at some leaf of the tree (i.e., trained using all T data sets/batches).

Even with the bound in Theorem 1, traversing the search space exhaustively can be generally impractical. Moreover, as discussed above, enforcing consistency when generating the children of a node, and their regressors, may be intractable. Instead, various search methods can be used to explore the space, with the aim of reaching a "high quality" regressor at some (depth T) leaf of the tree. In some implementations, three primary considerations in the search process can include: child generation, node evaluation or scoring, and/or the search procedure.

Given node $n_{k-1}$, there are, in principle, exponentially many action assignments, or children, $\Sigma_\Theta(D_k)$ (though Theorem 1 significantly limits the number of children if consistency is enforced). For this reason, heuristics for generating a small set of children are considered. Three primary factors can drive these heuristics.

The first factor is a preference for generating high-value assignments. In some implementations, to accurately reflect the intent of (sampled) Bellman backups, it is preferred to assign actions to state s'∈χ(D) with larger predicted Q-values over actions with lower values, i.e., a preference for a over a' if $$Q_{\theta_{k-1}^j}(s', a) > Q_{\theta_{k-1}^j}(s', a').$$

However, since the maximizing assignment may be Θ-inconsistent (in isolation, or jointly with the parent's information set, or with future assignments), candidate children should merely have higher probability of a high-value assignment. The second factor is the need to ensure diversity in the assignments among the set of children. Policy commitments at stage k constrain the possible assignments at subsequent stages. In many search procedures (e.g., beam search), backtracking can be avoided, so it can be desired that the policy commitments made at stage k offer as much flexibility as possible in later stages. The third factor is the degree to which consistency is enforced.

There are several ways to generate such high-value assignments. For example, one natural technique is sampling action assignments using a Boltzmann distribution. Specifically, let a denote the assignment (information set) of some node (parent) at level k-1 in the tree. An assignment σ_k for D_k can be generated as follows. Assume some permutation $s_1', \ldots, s_{|D_k|}'$ of χ(D_k). For each $s_i'$ in turn, $a_i$ can be sampled with probability proportional to e $$\tau Q_{\theta_{k-1}(s_i', a_i)}.$$

This can be done without regard to consistency, in which case the consistency penalty can generally be used when constructing the regressor θ_k for this child to "encourage" consistency rather than enforce it. In some implementations, if strict consistency is desired, rejection sampling without replacement can be used to ensure $a_i$ is consistent with $σ_{k-1}^j ∪ σ_{≤i-1}$. Additionally or alternatively, a subset of $σ_{k-1}^j$ can be used as a less restrictive consistency buffer. In some implementations, at least one action for state $s_i'$ must be consistent with any previous (consistent) information set. The temperature parameter τ can control the degree to which the system focuses on purely maximizing assignments versus more diverse, random assignments. While stochastic sampling can ensure some diversity, this procedure will bias selection of high-value actions to states s'∈χ(D_k) that occur early in the permutation. In some implementations, to ensure sufficient diversity, new random permutation can be used for each child.

Once the children of some expanded node are generated (and, optionally, their regressors constructed), the quality of each child can be evaluated as a means of deciding which new nodes are most promising for expansion. A variety of techniques can be used including using the average 0-label (overall and/or weighted using some initial state distribution), using the Bellman error, using the loss incurred by the regressor (including the consistency penalty or other regularizer) and/or using one or more additional scoring techniques. However, care must be taken when comparing nodes at different depths of the search tree, since deeper nodes have a greater chance to accrue rewards or costs—simple calibration methods can be used. Additionally or alternatively, when a simulator is available, rollouts of the induced greedy policy can be used in evaluating the quality of a node/regressor. In some implementations, using rollouts in this fashion incurs considerable computational expense during training relative to more direct scoring based on properties on the node, regressor, or information set.

Given any particular way of generating/sampling and scoring children, a variety of different search procedures can be applied including: a best-first search, a beam search, a local search, and/or one or more additional types of searches. Moreover, hybrid strategies are possible—a variant of beam search is described below in which multiple children are generated only at certain levels of the tree, with "deep dives" using consistency-penalized Q-regression at the intervening levels. This can reduce the size of the search tree considerably and, when managed properly, can add only a constant-factor (proportional to beam size) slowdown to standard Q-learning methods like DQN.

For example, a modified beam search framework can be used to effectively navigate the large search space that arises in practical RL settings. In some implementations, a modified beam search framework can include a modified beam-search strategy with backtracking and priority scoring.

In some implementations, the modified beam search process can grow the tree in a breadth-first manner, and alternates between two phases, an expansion phase and a dive phase. In an expansion phase, parent nodes are expanded, generating one or more child nodes with action assignments sampled from the Boltzmann distribution. For each child, target Q-labels can be created. Additionally or alternatively, the child's regressor can be optimized using consistency-penalized Bellman error (equation (2)) as the loss. In some implementations, the system can forgo strict policy consistency, and instead "encourage" consistency in regression. In a dive phase, each parent generates one child, whose action assignment is given by the usual max-actions selected by the parent node's regressor as in standard Q-learning. In some implementations, no additional diversity is considered in the dive phase, but consistency is promoted using consistency-penalized regression.

In some implementations, the search can begin from the root with an expansion phase to create c children—where c is the splitting factor. Each child inherits its parent's consistency buffer from which the new action assignments that were used to generate that child's Q-labels can be added. In some implementations, to limit the size of the tree, only subset of the children, the frontier nodes, are tracked. In some implementations, the frontier nodes can be selected using one of several possible scoring functions. In some implementations, the system can select the top/nodes for expansion, the system proceed to a dive phase, and the system can iterate.

In some implementations, it can be possible to move beyond this "beam-like" approach and consider backtracking strategies that will return to unexpanded nodes at shallower depths of the tree.

Algorithm 2 below is an example of a modified beam search framework in accordance with some implementations.

---

Algorithm 2 Modified Beam Search Instantiation of CONQUR Algorithm

Input: Search control parameters: m, l, c, d, T
1.     Maintain list of data batches $D_1, \ldots, D_k$, initialized empty
2.     Maintain candidate pool P of at most m nodes, initialized P = $\{n_0\}$
3.     Maintain frontier list F of $l^c$ nodes
4.     Maintain for each node $n_k^i$ a regressor $\theta_k^i$ and an ancestor assignment $\sigma_k^i$
5.     for each search level k ≤ T do
6.         Find top scoring node $n^1 \in P$
7.         Use ε – greedy policy extracted from $Q_{\theta^1}$ to collect next data batch $D_k$
8.         if k is an expansion level then

---

Algorithm 2 Modified Beam Search Instantiation of CONQUR Algorithm

9.         Select top l scoring nodes $n^1, \ldots, n^l \in P$
10.        for each selected node $n^i$ do
11.           Generate c children $n^{i,1}, \ldots, n^{i,c}$ using Boltzmann sampling on $D_k$ with $Q_{\theta^i}$
12.           for each child $n^{i,j}$ do
13.             Let assignment history $\sigma^{i,j}$ be $\sigma^i \cup \{\text{new assignment}\}$
14.             Determine regressor $\theta^{i,j}$ by applying update (3) from $\theta^i$
15.           end for
16.           Score and add child nodes to the candidate pool P
17.           Assign frontier nodes to set of child nodes, $F = \{n^{i,j}\}$
18.           if |P| > m then
19.             evict bottom scoring nodes, keeping top m in P
20.           end if
21.        end for
22.       end if
23.       if k is a refinement ("dive") level then
24.         for each frontier node $n^{i,j} \in F$ do
25.           Update regressor $\theta^{i,j}$ by applying update (3) to $\theta^{i,j}$
26.         end for
27.       end if
28.       Run d "dive" levels after each expansion level
29.     end for

---

Algorithm 1 and Algorithm 2 described above are merely illustrative examples of using a search framework in accordance with implementations disclosed herein. Additional and/or alternative search framework(s) can be utilized.

Turning now to the figures, FIG. 1 illustrates an example environment 100 in which implementations described herein may be implemented. FIG. 1 includes an agent 102 which can take action(s) in an environment. One or more actions taken by agent 102 to transition from a given state to the next state in an environment can be generated by action generator engine 104 using value network 106. In some implementations, value network 106 can be used to process the current state of the agent to generate a corresponding score for the current state.

In some implementations, agent 102 can be a robot agent which can perform tasks in an environment. For example, the robot agent can be a robotic arm which can grasp objects using a grasping end effector. Value network 106 can be used to process the current state of the robot agent to generate a corresponding score for the state. generate actions by processing the current state of the robot agent. In some implementations, the current state of the robot agent can include one or more instances of vision data capturing the robot agent in the environment. In some of those implementations, the instance(s) of vision data capturing the robot agent in the environment can be captured using a vision component of the robot, a vision component of the environment, and/or an additional or alternative vision component. Additionally or alternatively, the current state of the robot can include one or more instances of robot state data capturing parameter(s) indicating the state of the robot. For example, the robot state data can include the position of one or more components of the robot (e.g., the position of an arm of the robot, the position of a grasping end effector of the robot, the position of the body of the robot, etc.), the acceleration of one or more components of the robot, the velocity of one or more components of the robot, and/or additional or alternative information regarding component(s) of the robot.

Additionally or alternatively, agent 102 can be a software agent. For example, the software agent can recommend one or more items of content for a user (e.g., the software agent can recommend one or more videos for a user). In some implementations, the state of the software agent can include one or more instances of vision data capturing the state of the software agent. For example, the software agent can recommend content to a user of an automated assistant client. For instance, the user can speak the utterance of "Assistant, play music". The software agent can be utilized to select 'hypothetical song' to play for the user based on state data, such as the location of the automated assistant, musical preferences of the user stored in a user profile associated with the user, and/or additional or alternative state data. Furthermore, the automated assistant client can be used to render 'hypothetical song' for the user.

In some implementations, training engine 108 can train value network 106 based on one or more batches of training data 110. A batch of training data can include one or more training instances. For example, a training instance can include a given state of the agent, an action to transition the agent from the given state to the next state, the next state itself, and/or a reward. In some implementations, the one or more batches of training data can be generated using training batch engine 112. For example, training batch engine 112 can randomly divide training instances into one or more batches of training data. In some implementations, the batches of training data each include the same number of training instances. Additionally or alternatively, the batches of training data can include a varying number of training instances. In some implementations, a particular training instance is not repeated in more than one batches of training data. Additionally or alternatively, one or more training instances can be repeated in one or more batches of training data.

Figure 2:
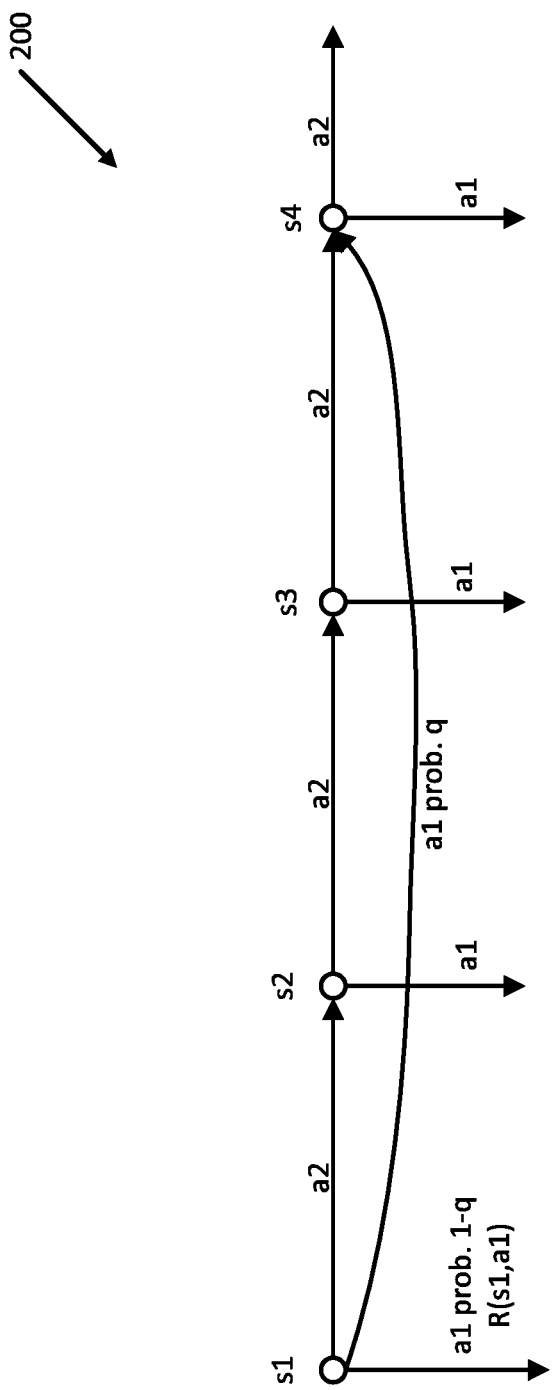
FIG. 2 illustrates an example of delusional bias in accordance with implementations described herein.

FIG. 2 includes a Markov Decision Process (MDP) 200 illustrating delusional bias. For example, a linear approximator can be used over a specific set of features in MDP 200. In the illustrated example, it can be shown that: (1) No $\pi \in G(\Theta)$ can express the optimal (unconstrained) policy (which requires taking $a_2$ at each state); (2) The optimal feasible policy in $G(\Theta)$ takes $a_1$ at $s_1$ and $a_2$ at $s_4$ (achieving a value of 0.5); and (3) Online Q-learning (e.g., eq. (1)) with data generated using an E-greedy behavior policy must converge to a fixed point (under a range of rewards and discounts) corresponding to a "compromise" admissible policy which takes $a_1$ at both $s_1$ and $s_4$ (value of 0.3). Q-learning fails to find a reasonable fixed-point because of delusion. Consider the backups at $(s_2, a_2)$ and $(s_3, a_2)$. Suppose $\hat{\theta}$ a "high" value to $(s_3, a_2)$, so that $Q_{\hat{\theta}}(s_3, a_2) > Q_{\hat{\theta}}(s_3, a_1)$ as required by $\pi_{\theta'}$. They show that any such $\hat{\theta}$ also accords a "high" value to $(s_2, a_2)$. But $Q_{\hat{\theta}}(s_2, a_2) > Q_{\hat{\theta}}(s_2, a_1)$ is inconsistent with the first requirement. As such, any update that makes the Q-value of $(s_2, a_2)$ higher undercuts the justification for it to be higher (i.e., makes the "max" value of its successor state $(s_3, a_2)$ lower). In the illustrated example, this occurs not due to approximation error, but due the inability of Q-learning to find the value of the optimal representable policy.

FIG. 3 illustrates an example search framework 300 in accordance with implementations described herein. Search framework 300 includes a root node $N_0$, a first node at a first level $N_1^1$, a second node at the first level $N_1^2$, a third node at the first level $N_1^3$, a first node at a second level $N_2^1$, a second node at the second level $N_2^2$, and a third node at the third level $N_2^3$, where nodes $N_1^1$, $N_1^2$, and $N_1^3$ are connected to the root node and nodes $N_2^1$, $N_2^2$, and $N_2^3$ are connected to node $N_1^2$. Each node has a corresponding Q-function which can be used to bootstrap the label(s). For example, the root node $N_0$ has a Q-function $Q_0$ which can be used to bootstrap the labels generated for the first batch of training data. In some implementations, $Q_0$ can be randomly initialized. Nodes in the first level can be generated using a first batch of training data. In the illustrated example, a search framework 300 transitions from the root node $N_0$ to the first node at the first level $N_1^1$ based on action assignment $\sigma_1^1$ with a corresponding Q-function $Q_1^1$; transitions from the root node to $N_0$ to the second node at the first level $N_1^2$ based on action assignment $\sigma_1^2$ with a corresponding Q-function $Q_1^2$; and transitions from the root node $N_0$ to the third node at the first level $N_1^3$ based on action assignment $\sigma_1^3$ with a corresponding Q-function $Q_1^3$. Similarly, nodes in the second level can be generated using a second batch of training data. For example, the search framework 300 transitions from the second node at the first level $N_1^2$ to the first node at the second level $N_2^1$ based on action assignment $\sigma_2^1$ with a corresponding Q-function $Q_2^1$; transitions from the second node at the first level $N_1^2$ to the second node at the second level $N_2^2$ based on action assignment $\sigma_2^2$ with a corresponding Q-function $Q_2^2$; and transitions from the second node at the first level $N_1^2$ to the third node at the second level $N_2^3$ based on action assignment $\sigma_2^3$ with a corresponding Q-function $Q_3^2$.

As described above, assume training data is divided into batches $D_1, \ldots D_T$ and some initial Q-function estimate $\theta_0$ (for bootstrapping $D_1$'s labels). The regressor $\theta_k$ for $D_k$ can, in principle, be trained with labels generated by any assignment $\sigma \in \Sigma_\Theta(D_k)$ of actions to its successor states $\chi(D_k)$, not necessarily maximizing actions with respect to $\theta_{k-1}$. Each a can give rise to a different updated Q-estimator $\theta_k$. In some implementations, there are several restrictions which could be placed on "reasonable" $\sigma$-candidates: (i) $\sigma$ is $\Theta$-consistent; (ii) $\sigma$ is jointly $\Theta$-consistent with all $\sigma_j$, for $j<k$, used to construct the prior regressors on which $\theta_{k-1}$ is bootstrapped; (iii) a is not dominated by any $\sigma' \in \Sigma r_\Theta(D_k)$, where we say $\sigma'$ dominates $\sigma$ if $Q_{\theta_{k-1}}(s', \sigma'(s')) \geq Q_{\theta_{k-1}}(s', \sigma(s'))$ for all $s' \in \chi(D)$, and this inequality is strict for at least one $s'$. Conditions (i) and (ii) are the strict consistency requirements of PCQL, and in some implementations, these conditions can be relaxed. Additionally or alternatively, condition (iii) is inappropriate in general, since additional assignments (e.g., to new data) may be added that render all non-dominated assignments inconsistent, requiring that reversion to some dominated assignment.

This generates a generic search space for finding policy-consistent, delusion-free Q-function. Each node $n_k^i$ at depth k in the search tree is associated with a regressor $\theta_k^i$ defining $Q_{\theta_k^i}$ action assignment $\sigma_k^i$ that justifies the labels used to train $\theta_k^i$. In some implementations, $\sigma_k^i$ can also be viewed as an information set. In some implementations, a root node $n_0$ can be assumed based on an initial regression $\theta_0$, and has an empty action assignment $\sigma_0$. In some implementations, nodes at level k of the tree can be defined as follows. For each node $n_{k-1}^i$ at level k−1, with regressor $\theta_{k-1}^i$ and Q-consistent assignment $\sigma_{k-1}^i$, a child node $n_k^j$ can be generated for each $\sigma_k^j \in \Sigma r_\Theta(D_k)$ such that $\sigma_{k-1}^i$ is $\Theta$-consistent. In some implementations, node $n_k^j$'s assignment is $\sigma_{k-1}^i \cup \sigma_k^j$, and its regressor $\theta_k^i$ can be trained using the following data set:

$$\{(s, a \mapsto r + \gamma Q_{\theta_{k-1}}(s^i, \sigma_k^j, (s') : (s, a, r, s') \in D_k\}$$

In some implementations, the entire search space can be constructed in this fashion to a maximum depth of T.

Figure 4:
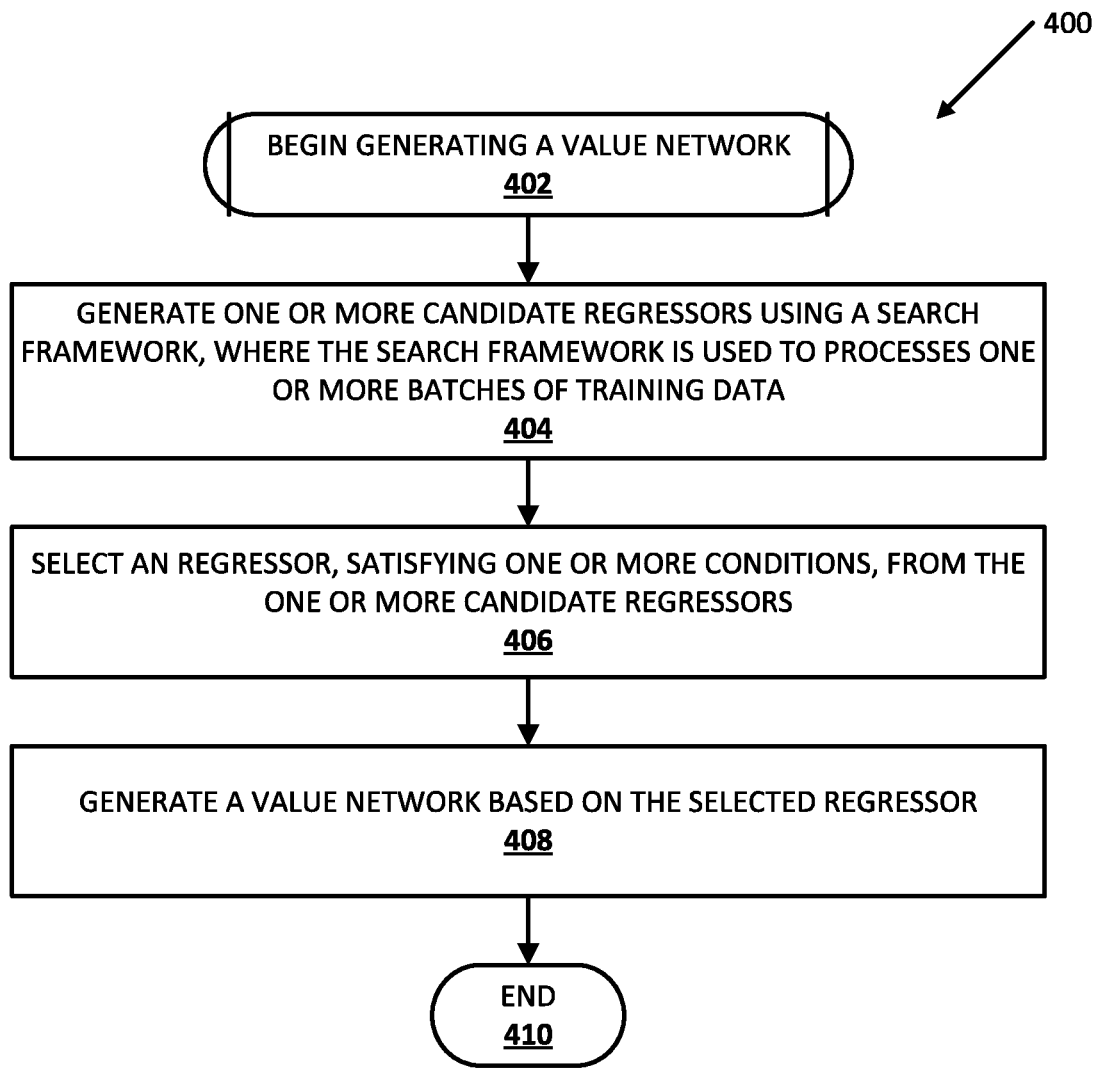
FIG. 4 is a flowchart illustrating an example process of training a value network to mitigate delusional bias in accordance with implementations described herein.

FIG. 4 is a flowchart illustrating an example process 400 of training a value network to mitigate delusional bias in accordance with implementations described herein. For convenience, the operations of the flowchart are described with reference to a system that performs the operations. This system may include one or more components of various computing systems, such as processor(s) of agent 100, computing device 1010, and/or other computing systems. Moreover, while operations of process 400 are shown in a particular order, this is not meant to be limiting. One or more operations may be reordered, omitted, and/or added.

At block 402, process 400 begins generating a value network to mitigate delusional bias. In some implementations, the value network can be used to generate discrete actions for an agent. For example, the value network can be used to generate discrete actions for a software agent, such as a software agent used to recommend content to a user. In some implementations, the value network can be used to generate continuous actions for an agent. For example, the value network can be used to generate continuous actions for a robot agent, where the robot agent is performing a task. In some of those implementations, the state space of the agent can be continuous, and the value network can be trained using a sampling from the continuous state space of the agent.

At block 404, the system generates one or more candidate regressors using a search framework, where the search framework is used to process one or more batches of training data. For example, the system can generate the one or more candidate regressors using a depth-first search framework, such as the depth-first search framework of process 500 of FIG. 5 and/or process 600 of FIG. 6. Additionally, the system can generate the one or more candidate regressors using a modified beam search framework, such as the modified beam search framework of process 700 of FIG. 7, process 800 of FIG. 8, and/or process 900 of FIG. 9. Additional and/or alternative search frameworks can be utilized including a breadth first search framework, a beam search framework, and/or an additional search frameworks.

At block 406, the system selects a regressor, satisfying one or more conditions, from the one or more candidate regressors. For example, the system can select the candidate regressor which satisfies one or more conditions, such as the candidate regressor which eliminates delusional bias, the candidate regressor which reduces more delusional bias compared to the other candidate regressors, any candidate regressor which reduces delusional bias below a threshold amount and/or other conditions.

At block 408, the system generates a value network based on the selected regressor. In some implementations, the selected regressor is a function approximation for the value network. At block 410, process 400 ends.

Figure 5:
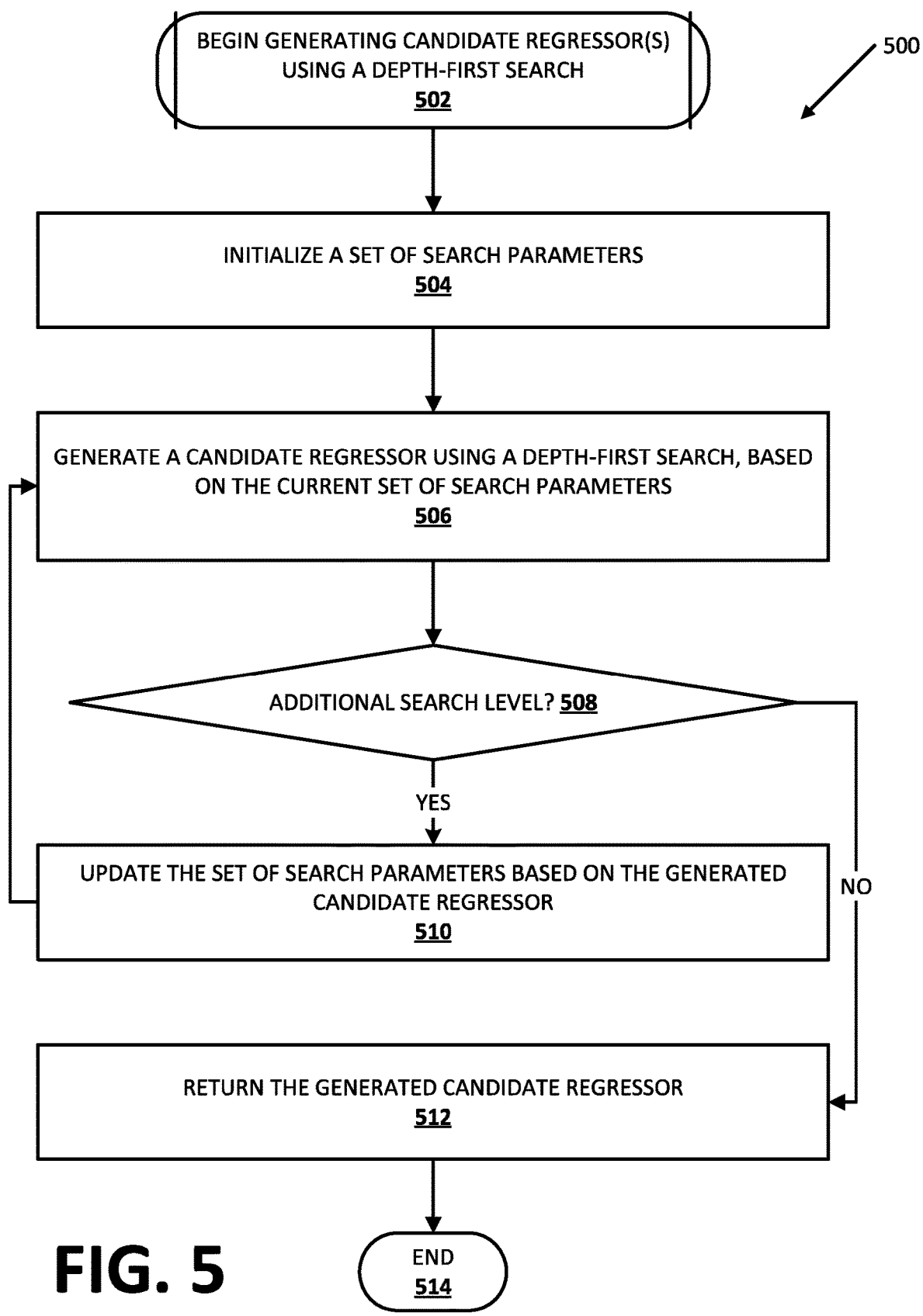
FIG. 5 is a flowchart illustrating an example process of generating one or more candidate regressors using a depth-first search in accordance with implementations described herein.

FIG. 5 is a flowchart illustrating an example process 500 of generating one or more candidate regressors using a depth-first search in accordance with implementations described herein. For convenience, the operations of the flowchart are described with reference to a system that performs the operations. This system may include one or more components of various computing systems, such as processor(s) of agent 100, computing device 1010, and/or other computing systems. Moreover, while operations of process 500 are shown in a particular order, this is not meant to be limiting. One or more operations may be reordered, omitted, and/or added.

At block 502, the system begins generating candidate regressor(s) using a depth-first search. In some implementations, the system begins generating candidate regressors in accordance with Algorithm 1 described above. In some implementations, process 500 is a recursive process.

At block 504, the system initializes a set of search parameters. In some implementations, the initialized set of search parameters can include, one or more batches of training data, an regressor for a previous iteration used to bootstrap the labels for the current iteration, a policy consistent action assignment, a policy class, and/or additional or alternative search parameter(s).

At block 506, the system generates a candidate regressor using a depth-first search, based on the current set of search parameters. In some implementations, the system generates the candidate regressor using the depth-first search in accordance with process 600 of FIG. 6.

At block 508, the system determines whether there is an additional search level. If so, the system proceeds to block 510, updates the set of search parameters based on the generated candidate regressor, before proceeding back to block 506 and generating an additional candidate regressor using a depth-first search, based on the updated set of search parameters. If the system determines there is not an additional search level, the system proceeds to block 512. In some implementations, the system determines whether to process an additional search level based on whether a threshold number of search levels have been processed, based on whether there are any additional unprocessed batches of training data, and/or based on additional or alternative condition(s).

At block 510, the system updates the set of search parameters based on the generated candidate regressor. In some implementations, the system can update the one or more unprocessed batches of training data, the regressor used to bootstrap labels for the next iteration, the policy consistent action assignment, the policy class, and/or can update additional or alternative parameter(s).

At block 512, the system returns the generated candidate regressor. In some implementations, the generated candidate regressor can be used to generate the value network with mitigated delusional bias. At block 514, the process ends.

Figure 6:
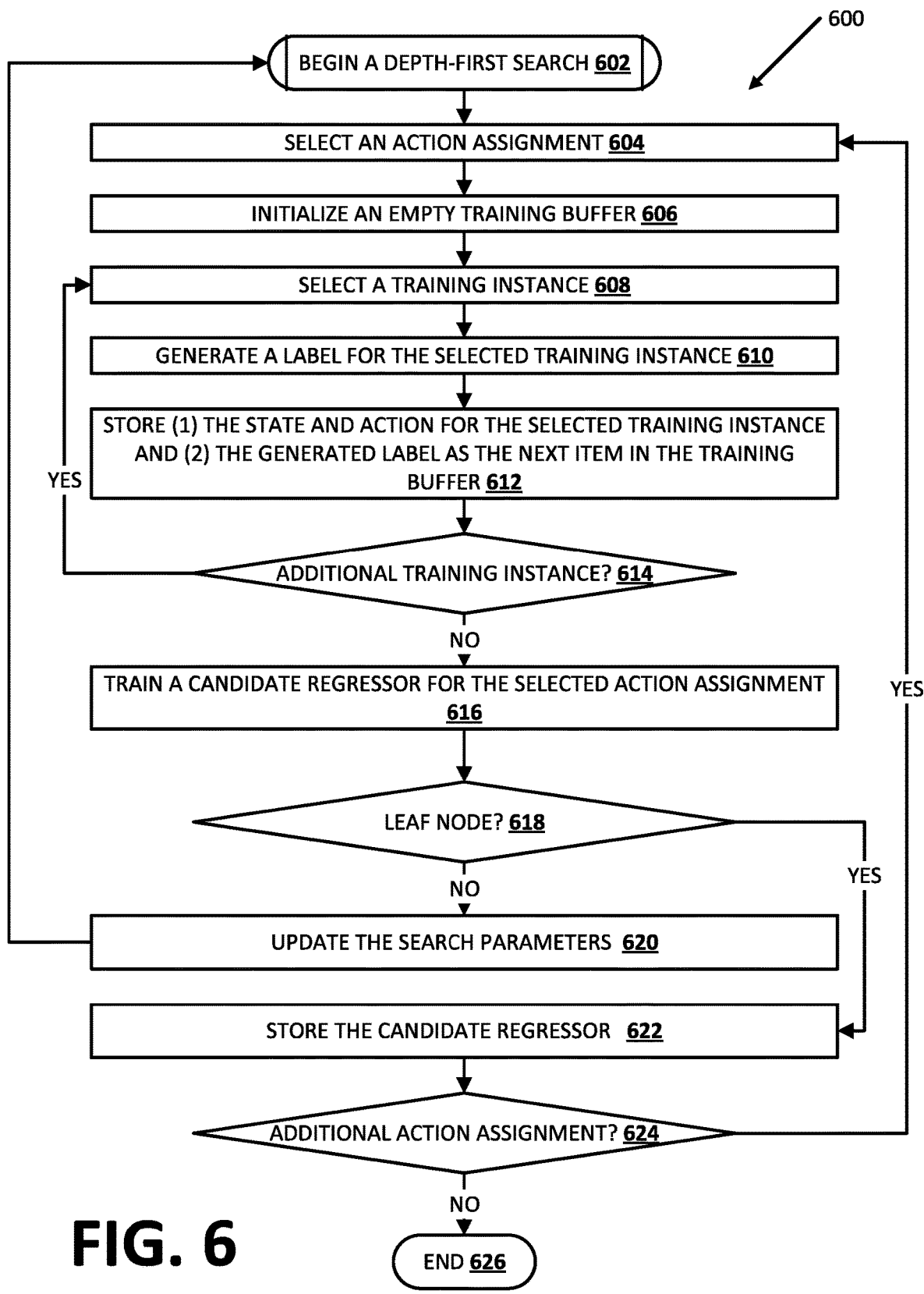
FIG. 6 is a flowchart illustrating an example process of performing a depth-first search in accordance with implementations described herein.

FIG. 6 is a flowchart illustrating an example process 600 of performing a depth-first search in accordance with implementations described herein. For convenience, the operations of the flowchart are described with reference to a system that performs the operations. This system may include one or more components of various computing systems, such as processor(s) of agent 100, computing device 1010, and/or other computing systems. Moreover, while operations of process 600 are shown in a particular order, this is not meant to be limiting. One or more operations may be reordered, omitted, and/or added.

At block 602, the system begins a depth-first search. In some implementations, the depth-first search is in accordance with Algorithm 1 described above.

At block 604, the system selects an action assignment. In some implementations, the system selects a policy consistent action assignment.

At block 606, the system initializes an empty training buffer.

At block 608, the system selects a training instance. In some implementations, the training instance is selected from a current batch of training data. In some implementations, the selected training instance includes a given state, an action to transition from the given state to a next state, the next state, and/or a reward.

At block 610, the system generates a label for the selected training instance. In some implementations, the label is generated based on the reward of the selected training instance, a regressor for a previous level, the next state, and/or an action assignment for the next state. In some implementations, the label includes an indication of the maximum reward achievable at the next state.

At block 612, the system stores (1) the state and action for the selected training instance and (2) the generated label for the training instance as the next item in the training buffer.

At block 614, the system determines whether to process an additional training instance in the current batch of training instances. If so, the system proceeds back to block 608, selects an additional training instance, and proceeds to blocks 610 and 612 using the additional training instance. If not, the system proceeds to block 616. In some implementations, the system can determine to not process an additional training instance in the current batch of training instances if all training instances in the current batch have been processed, if a threshold number of training instances for the current batch have been processes, and/or if additional or alternative condition(s) have been satisfied.

At block 616, the system trains the candidate regressor for the selected action assignment. In some implementations, the candidate regressor is trained based on the state-action pairs and corresponding labels included the training buffer.

At block 618, the system determines whether the selected action assignment can be used in generating a leaf node. If so, the system proceeds to block 622, stores the candidate regressor, and proceeds to block 624. If not, the system proceeds to block 620 and updates the search parameters. In some implementations, the system can determine whether it is at a leaf node based on whether there is an additional unprocessed batch of training data.

At block 620, the system updates the search parameters and recursively proceeds back to block 602 to begin a depth-first search based on the updated search parameters. In some implementations, the system can update the search parameters to include the one or more unprocessed batches of training data, the trained candidate regressor, the policy consistent action assignments, the policy class, and/or additional or alternative parameter(s).

At block 622, the system stores the candidate regressor before proceeding to block 624.

At block 624, the system determines whether to process any additional action assignments. If so, the system proceeds back to block 604, selects an additional action assignment, before proceeding to blocks 606, 608, 610, 612, 614, 616, 618, 620, and 622 based on the additional action assignment. If not, the system proceeds to block 626 and the process ends.

Figure 7:
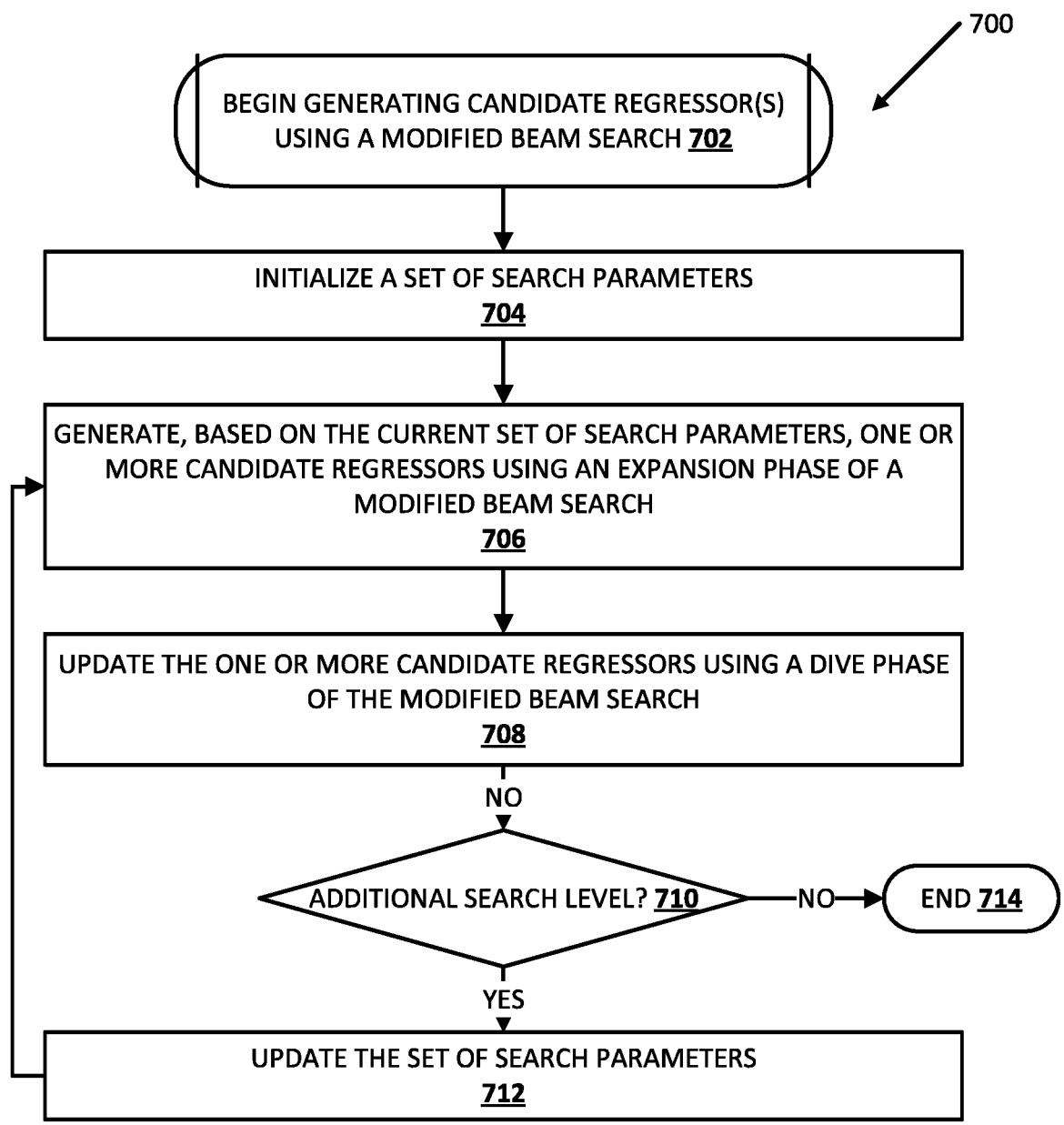
FIG. 7 is a flowchart illustrating an example process of generating one or more candidate regressors using a modified beam search in accordance with implementations described herein.

FIG. 7 is a flowchart illustrating an example process 700 of generating one or more candidate regressors using a modified beam search in accordance with implementations described herein. For convenience, the operations of the flowchart are described with reference to a system that performs the operations. This system may include one or more components of various computing systems, such as processor(s) of agent 100, computing device 1010, and/or other computing systems. Moreover, while operations of process 700 are shown in a particular order, this is not meant to be limiting. One or more operations may be reordered, omitted, and/or added.

At block 702, the system begins generating candidate regressor(s) using a modified beam search. In some implementations, the system generates candidate regressor(s) in accordance with Algorithm 2 described herein. In some implementations, the process can be used to keep track of a regressor and an ancestor assignment for each node generated using the modified beam search framework.

At block 704, the system initializes a set of search parameters. In some implementations, the search parameters can include a maximum number of nodes to store in a pool of candidate nodes, a maximum number of nodes to expand, a splitting factor indicating the number of child nodes to create for a parent node, a maximum number of frontier nodes to process in a dive phase, a number of iterations for each dive phase, one or more batches of training data, and/or additional or alternative search parameters.

At block 706, the system generates, based on the current set of search parameters, one or more candidate regressors using an expansion phase of a modified beam search. In some implementations, the expansion phase of the modified beam search is in accordance with process 800 of FIG. 8.

At block 708, the system updates the one or more candidate regressors using a dive phase of the modified beam search. In some implementations, the dive phase of the modified beam search is in accordance with process 900 of FIG. 9.

At block 710, the system determines whether to process an additional search level (e.g., whether to process an additional batch of training data). If so, the system proceeds to block 712 to update the set of search parameters, proceeds back to block 706 and performs blocks 706 and 708 based on the updated set of search parameters. If not, the system proceeds to block 714 and the process ends.

At block 712, the system updates the set of search parameters, proceeds back to block 706 and generates one or more additional candidate regressors using an expansion phase of the modified beam search before proceeding to blocks 708 and 710 based on the one or more additional candidate regressors.

Figure 8:
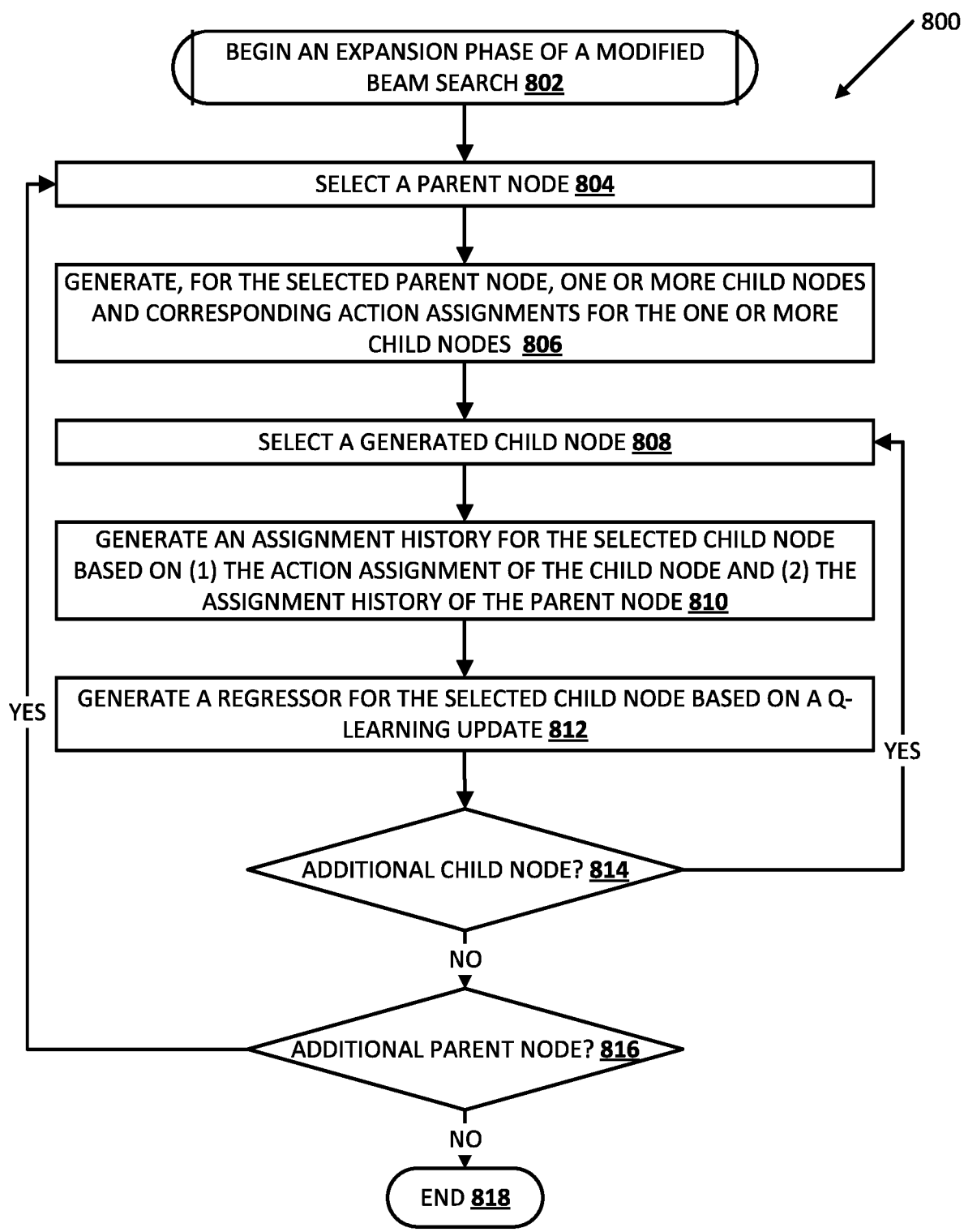
FIG. 8 is a flowchart illustrating an example process of performing an expansion phase of a modified beam search in accordance with implementations described herein.

FIG. 8 is a flowchart illustrating an example process 800 of performing an expansion phase of a modified beam search in accordance with implementations described herein. For convenience, the operations of the flowchart are described with reference to a system that performs the operations. This system may include one or more components of various computing systems, such as processor(s) of agent 100, computing device 1010, and/or other computing systems. Moreover, while operations of process 800 are shown in a particular order, this is not meant to be limiting. One or more operations may be reordered, omitted, and/or added.

At block 802, the system begins an expansion phase of a modified beam search framework.

At block 804, the system selects a parent node for processing. In some implementations, the system can select the parent node from a pool of candidate nodes generated in accordance with process 700 of FIG. 7. In some implementations, the system can select a top scoring parent node from the pool of candidate nodes. For example, the system can select a node previously generated in accordance with process 700 of FIG. 7. In some implementations, at a first iteration, the system can select a root node as the parent node. In some implementations, the system can select a top scoring parent node in the pool of candidate nodes, where the nodes in the pool of candidate nodes can be scored using a variety of scoring techniques can be used including using an average Q-label, using the Bellman error, using the loss incurred by the regressor, and/or using additional or alternative scoring techniques.

At block 806, the system generates, for the selected parent node, one or more child nodes and corresponding action assignments for the one or more child nodes. In some implementations, the number of child nodes generated for the selected parent node is indicated by a search parameter. In some implementations, each child node can be generated using Boltzmann sampling on the current batch of training data with the regressor for the parent node.

At block 808 the system selects a generated child node.

At block 810, the system generates an assignment history for the selected child node based on (1) the action assignment of the child node and (2) the assignment history of the selected parent node.

At block 812, the system generates a regressor for the selected child node based on a Q-learning update. In some implementations, the system generates the regressor for the selected child node based on a Q-learning update with a consistency penalty. For example, the system can generate the regressor for the selected child node using equation (3) described herein.

At block 814, the system determines whether to process an additional child node. If so, the system proceeds back to block 808, selects an additional child node, and proceeds to blocks 810 and 812 based on the additional child node. If not, the system proceeds to block 816. In some implementations, the system can determine to process an additional child node if one or more child nodes generated for the selected parent node are unprocessed.

At block 816, the system determines whether to process an additional parent node. If so, the system proceeds back to block 804, selects an additional parent node, and proceeds to blocks 806, 808, 810, 812, and 814 based on the additional parent node. If not, the system proceeds to block 818 and the process ends. In some implementations, the system can determine to not process an additional parent node if a threshold number of parent nodes have been processed and/or if one or more additional conditions are satisfied. In some implementations, the threshold number of parent nodes to process is indicated by a search parameter.

Figure 9:
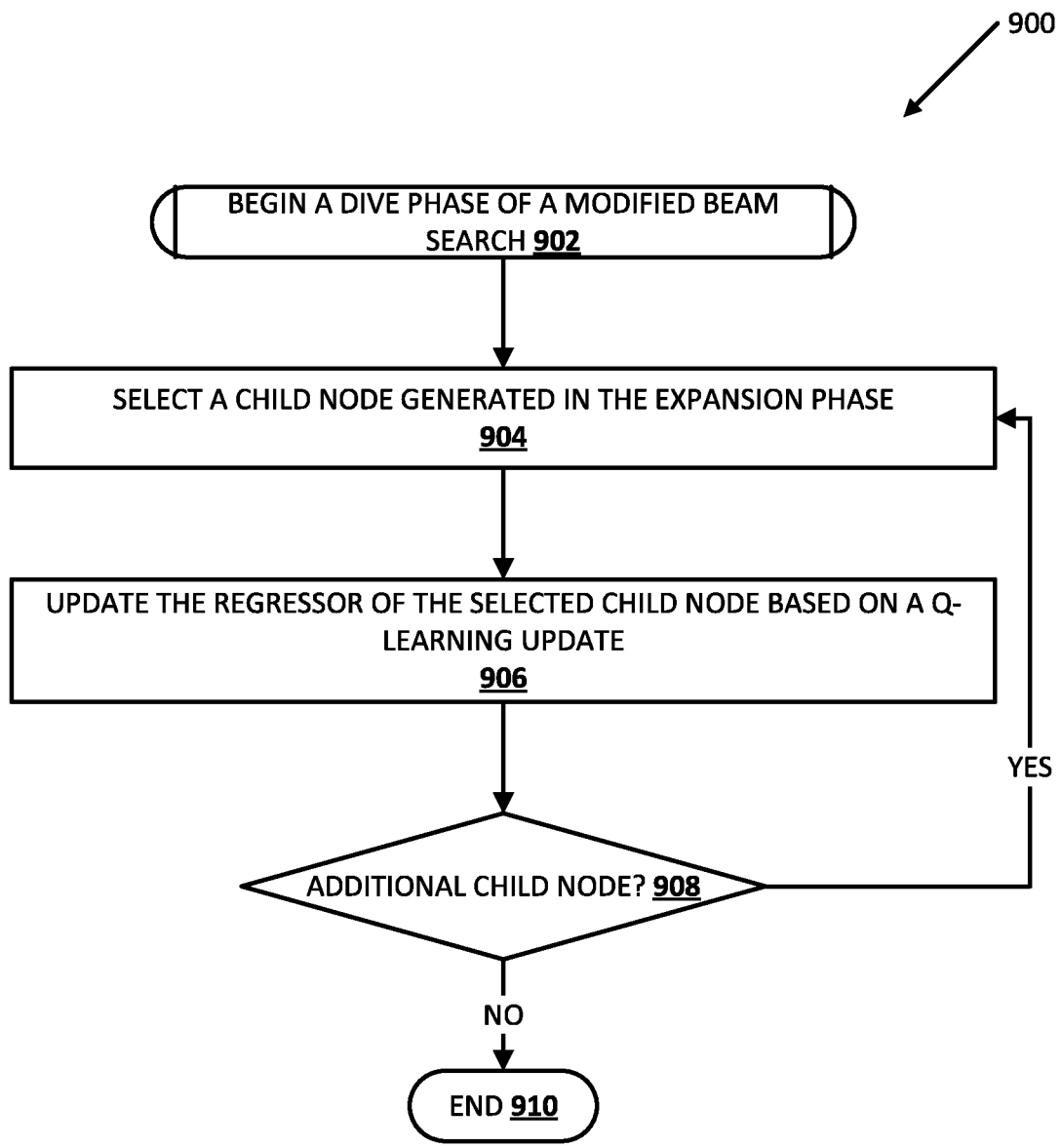
FIG. 9 is a flowchart illustrating an example process of performing a dive phase of a modified beam search in accordance with implementations described herein.

FIG. 9 is a flowchart illustrating an example process 900 of performing a dive phase of a modified beam search in accordance with implementations described herein. For convenience, the operations of the flowchart are described with reference to a system that performs the operations. This system may include one or more components of various computing systems, such as processor(s) of agent 100, computing device 1010, and/or other computing systems. Moreover, while operations of process 900 are shown in a particular order, this is not meant to be limiting. One or more operations may be reordered, omitted, and/or added.

At block 902, the system begins performing the dive phase of the modified beam search framework.

At block 904, the system selects a child node generated in the expansion phase. In some implementations, the system selects a child node stored in a set of frontier nodes during an expansion phase.

At block 906, the system updates the regressor of the selected child node based on a Q-learning updated. In some implementations, the system can update the regressor of the selected child node based on a Q-learning update with a consistency penalty. For example, the system can update the regressor of the selected child node using equation (3) described herein.

At block 908, the system determines whether to process an additional child node. If so, the system proceeds back to block 904, selects an additional child node, and proceeds back to block 904 using the additional child node. If not, the system proceeds to block 910 and the process ends. In some implementations, the system can determine to not process any addition child nodes if all child nodes in the set of frontier nodes have been processed, if a threshold number of child nodes have been processed, and/or if one or more additional or alternative conditions are satisfied.

Figure 10:
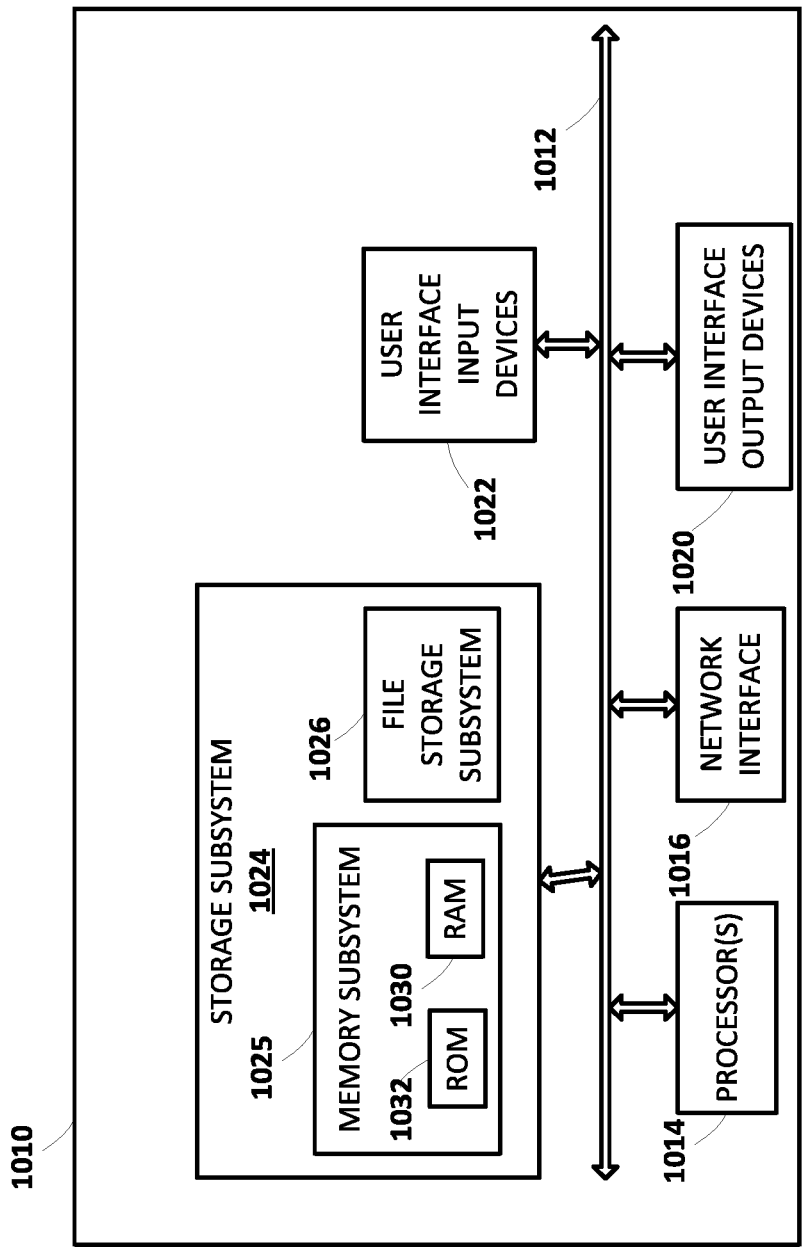
FIG. 10 schematically depicts an example architecture of a computer system.

FIG. 10 is a block diagram of an example computing device 1010 that may optionally be utilized to perform one or more aspects of techniques described herein. Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the processes of FIGS. 4, 5, 6, 7, 8, 9, and/or other methods described herein.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In some implementations, a method implemented by one or more processors is provided that includes training, using Q-learning, a value network to mitigate delusional bias. In some implementations, training the value network to mitigate delusional bias includes one or both of: (1) integrating, into the Q-learning used in training the value network, a soft-consistency penalty used to bias Q-labels, across training batches, towards being consistent with an expressible policy, and (2) generating the value network using a search framework. In some implementations, generating the value network using the search framework includes (a) generating, using the search framework, a plurality of candidate Q-regressors, (b) selecting a CI-regressor from the plurality of candidate Q-regressors, wherein selecting the Q-regressor is based on determining that the Q-regressor satisfies one or more conditions. In some implementations, the method includes providing the trained value network for deployment on a robotic and/or other agent.

These and other implementations of the technology disclosed herein can include one or more of the following features.

In some implementations, the method further includes generating a policy network based on the value network. The method further includes generating one or more actions, for the robotic and/or other agent, based on the policy network.

In some implementations, training the value network to mitigate delusional bias includes integrating, into the Q-learning, the soft-consistency penalty used to bias the Q-labels, across the training batches, towards being consistent with the expressible policy.

In some implementations, training the value network to mitigate delusional bias includes generating the value network using the search framework.

In some implementations, training the value network to mitigate delusional bias includes (1) integrating, into the Q-learning used in training the value network, the soft-consistency penalty used to bias Q-labels, across training batches, towards being consistent with the expressible policy, and (2) generating the value network using the search framework. In some versions of those implementations, integrating, into the Q-learning, the soft-consistency penalty used to bias the q-labels, across the training batches, towards being consistent with the expressible policy updating a Q-regressor, wherein updating the Q-regressor is based on (a) a given batch of training data including one or more training instances, wherein each training instance includes a current state of the agent, a next state of the agent, an action to transition the agent form the current state to the next state, and a reward; (b) for each of the one or more training instances, a Q-value based on the current state of the agent and the action to transition the agent from the current state to the next state, a Q-value based on the next state of the agent, and the reward of the training instance; (c) a value of a Q-regressor generated using one or more previous batches of training data; and (d) the soft-consistency penalty. In some versions of those implementations, the method further includes generating the Q-value based on the next state of the agent, wherein generating the Q-value based on the next state of the agent comprises bootstrapping the Q-value using a prior estimator. In some versions of those implementations, the soft-consistency penalty acts as a penalty based on one or more actions inconsistent with the value network.

In some implementations, the search framework is a depth-first search framework, and wherein generating, using the depth-first search framework, the plurality of candidate Q-regressors includes generating an initial set of search parameters including an initial batch of training instances. The method further includes generating an initial candidate Q-regressor using the depth-first search framework based on the initial set of search parameters. The method further includes generating an additional set of search parameters based on the initial set of search parameters, the generated candidate Q-regressor, and an additional batch of training instances. The method further includes generating an additional candidate Q-regressor using the depth-first search framework based on the additional set of search parameters. In some versions of those implementations, generating, using the depth-first search framework, the plurality of candidate Q-regressors further includes generating a further set of search parameters based on the additional set of search parameters, the additional generated candidate Q-regressor, and a further batch of training instances. The method further includes generating a further candidate Q-regressor using the depth-first search framework based on the further set of search parameters. In some versions of those implementations, each training instance in the additional batch of training instances includes a current state, a next state, an action to transition from the current state to the next state, and a reward, and wherein generating the additional candidate Q-regressor using the depth-first search framework based on the additional set of search parameters includes, for each training instance in the additional batch of training instances, generating a Q-value for the training instance based on the reward and the Q-value for the next state; storing the current state, the action, and the generated Q-value as a next item in a training buffer; and generating the additional candidate Q-regressor based on the items in the training buffer. In some versions of those implementations, the method further includes generating the Q-value for the next state, wherein generating the Q-value for the next state comprises bootstrapping the Q-value for the training instance using the initial candidate Q-regressor.

In some implementations, the search framework is a modified beam search framework, and wherein generating, using the modified beam search framework, the plurality of candidate Q-regressors includes generating an initial set of search parameters including an initial batch of training instances. The method further includes generating, based on the initial set of search parameters, one or more candidate Q-regressors using an initial expansion phase of the modified beam search framework. The method further includes generating, based on the generated one or more candidate Q-regressors, one or more updated candidate Q-regressors using an initial dive phase of the modified beam search framework. The method further includes generating an additional set of search parameters including an additional batch of training instances. The method further includes generating, based on the additional set of search parameters and until one or more additional conditions are satisfied, one or more additional candidate Q-regressors using an additional expansion phase of the modified beam search framework. The method further includes generating, based on the one or more additional candidate Q-regressors, one or more additional updated candidate Q-regressors using an additional dive phase of the modified beam search framework. In some versions of those implementations, generating, using the modified beam search framework, the plurality of candidate Q-regressors further generating a further set of search parameters including a further batch of training instances. The method further includes generating, based on the further set of search parameters, one or more further candidate Q-regressors using a further expansion phase of the modified beam search framework. The method further includes generating, based on the one or more further candidate Q-regressors, one or more further updated Q-regressors using a further dive phase of the modified beam search framework. In some versions of those implementations, generating, based on the additional set of search parameters, the one or more additional candidate Q-regressors using the additional expansion phase of the modified beam search framework includes, for each parent node in a plurality of parent nodes, wherein the plurality of parent nodes are child nodes generated in the initial expansion phase of the modified beam search framework, and wherein each parent node includes a corresponding regressor and a corresponding ancestor action assignment, generating a plurality of child nodes by sampling the additional batch of training instances with a Q-regressor of the parent node. For each child node in the plurality of child nodes, the method further includes generating an action assignment for the child node based on the action assignment of the parent node, and generating a regressor for the child node using a CI-learning update. The method further includes generating the one or more additional candidate Q-regressors based on the generated regressor for the plurality of child nodes. In some versions of those implementations, generating, based on the one or more additional candidate Q-regressors, one or more additional updated candidate Q-regressors using the additional dive phase of the modified beam search framework includes, for each child node, generated in the additional expansion phase, in a plurality of child nodes generated in the additional expansion phase of the modified beam search, updating the regressor of the child node, generated in the additional expansion phase, using an additional Q-learning update.

In some implementations, the method further includes generating, by processing a current state of the robotic and/or other agent using the trained value network, an action to transition the agent to a next state. The method further includes causing the robotic and/or other agent to perform an action to transition the agent to the next state. In some versions of those implementations, the agent is a robotic agent, and wherein the current state of the robotic agent includes one or more instances of vision data captured using a vision component of the robot and/or one or more instances of robot state data capturing one or more parameters indicating the state of the robotic agent. In some versions of those implementations, the agent is a software agent, and wherein the current state of the agent includes a sequence state data capturing the state of the software agent.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   training, using Q-learning, a value network to mitigate delusional bias, wherein training the value network to mitigate delusional bias comprises one or both of:
   (1) integrating, into the Q-learning used in training the value network, a soft-consistency penalty used to bias Q-labels, across training batches, towards being consistent with an expressible policy; and
   (2) generating the value network using a search framework, wherein generating the value network using the search framework comprises:
      (a) generating, using the search framework, a plurality of candidate Q-regressors,
      (b) selecting a Q-regressor from the plurality of candidate Q-regressors, wherein selecting the Q-regressor is based on determining that the Q-regressor satisfies one or more conditions; and
   providing the trained value network for deployment on a robotic and/or other agent.

2. The method of claim 1, further comprising:
   generating a policy network based on the value network; and
   generating one or more actions, for the robotic and/or other agent, based on the policy network.

3. The method of claim 1, wherein training the value network to mitigate delusional bias comprises:
   integrating, into the Q-learning, the soft-consistency penalty used to bias the Q-labels, across the training batches, towards being consistent with the expressible policy.

4. The method of claim 3, wherein integrating, into the Q-learning, the soft-consistency penalty used to bias the Q-labels, across the training batches, towards being consistent with the expressible policy comprises:
   updating a Q-regressor, wherein updating the Q-regressor is based on:
      a given batch of training data including one or more training instances, wherein each training instance includes a current state of the agent, a next state of the agent, an action to transition the agent form the current state to the next state, and a reward;
      for each of the one or more training instances, a Q-value based on the current state of the agent and the action to transition the agent from the current state to the next state, a Q-value based on the next state of the agent, and the reward of the training instance;
a value of a Q-regressor generated using one or more previous batches of training data; and
the soft-consistency penalty.

5. The method of claim 4, further comprising generating the Q-value based on the next state of the agent, wherein generating the Q-value based on the next state of the agent comprises bootstrapping the Q-value using a prior estimator.

6. The method of claim 4, wherein the soft-consistency penalty acts as a penalty based on one or more actions inconsistent with the value network.

7. The method of claim 1, wherein training the value network to mitigate delusional bias comprises:
generating the value network using the search framework.

8. The method of claim 7, wherein the search framework is a depth-first search framework, and wherein generating, using the depth-first search framework, the plurality of candidate Q-regressors comprises:
generating an initial set of search parameters including an initial batch of training instances; and
generating an initial candidate Q-regressor using the depth-first search framework based on the initial set of search parameters;
generating an additional set of search parameters based on the initial set of search parameters, the generated candidate Q-regressor, and an additional batch of training instances; and
generating an additional candidate Q-regressor using the depth-first search framework based on the additional set of search parameters.

9. The method of claim 8, wherein generating, using the depth-first search framework, the plurality of candidate Q-regressors further comprises:
generating a further set of search parameters based on the additional set of search parameters, the additional generated candidate Q-regressor, and a further batch of training instances; and
generating a further candidate Q-regressor using the depth-first search framework based on the further set of search parameters.

10. The method of claim 8, wherein each training instance in the additional batch of training instances includes a current state, a next state, an action to transition from the current state to the next state, and a reward, and wherein generating the additional candidate Q-regressor using the depth-first search framework based on the additional set of search parameters comprises:
for each training instance in the additional batch of training instances:
generating a Q-value for the training instance based on the reward and the Q-value for the next state;
storing the current state, the action, and the generated Q-value as a next item in a training buffer; and
generating the additional candidate Q-regressor based on the items in the training buffer.

11. The method of claim 10, further comprising generating the Q-value for the next state, wherein generating the Q-value for the next state comprises bootstrapping the Q-value for the training instance using the initial candidate Q-regressor.

12. The method of claim 7, wherein the search framework is a modified beam search framework, and wherein generating, using the modified beam search framework, the plurality of candidate Q-regressors comprises:
generating an initial set of search parameters including an initial batch of training instances;
generating, based on the initial set of search parameters, one or more candidate Q-regressors using an initial expansion phase of the modified beam search framework;
generating, based on the generated one or more candidate Q-regressors, one or more updated candidate Q-regressors using an initial dive phase of the modified beam search framework;
generating an additional set of search parameters including an additional batch of training instances;
generating, based on the additional set of search parameters and until one or more additional conditions are satisfied, one or more additional candidate Q-regressors using an additional expansion phase of the modified beam search framework; and
generating, based on the one or more additional candidate Q-regressors, one or more additional updated candidate Q-regressors using an additional dive phase of the modified beam search framework.

13. The method of claim 12, wherein generating, using the modified beam search framework, the plurality of candidate Q-regressors further comprises:
generating a further set of search parameters including a further batch of training instances;
generating, based on the further set of search parameters, one or more further candidate Q-regressors using a further expansion phase of the modified beam search framework; and
generating, based on the one or more further candidate Q-regressors, one or more further updated Q-regressors using a further dive phase of the modified beam search framework.

14. The method of claim 12, wherein generating, based on the additional set of search parameters, the one or more additional candidate Q-regressors using the additional expansion phase of the modified beam search framework comprises:
for each parent node in a plurality of parent nodes, wherein the plurality of parent nodes are child nodes generated in the initial expansion phase of the modified beam search framework, and wherein each parent node includes a corresponding regressor and a corresponding ancestor action assignment:
generating a plurality of child nodes by sampling the additional batch of training instances with a Q-regressor of the parent node;
for each child node in the plurality of child nodes:
generating an action assignment for the child node based on the action assignment of the parent node; and
generating a regressor for the child node using a Q-learning update; and
generating the one or more additional candidate Q-regressors based on the generated regressor for the plurality of child nodes.

15. The method of claim 14, wherein generating, based on the one or more additional candidate Q-regressors, one or more additional updated candidate Q-regressors using the additional dive phase of the modified beam search framework comprises:
for each child node, generated in the additional expansion phase, in a plurality of child nodes generated in the additional expansion phase of the modified beam search:

updating the regressor of the child node, generated in the additional expansion phase, using an additional Q-learning update.

16. The method of claim 1, wherein training the value network to mitigate delusional bias comprises:
   (1) integrating, into the Q-learning used in training the value network, the soft-consistency penalty used to bias Q-labels, across training batches, towards being consistent with the expressible policy; and
   (2) generating the value network using the search framework.

17. The method of claim 1, further comprising:
   generating, by processing a current state of the robotic and/or other agent using the trained value network, an action to transition the agent to a next state; and
   causing the robotic and/or other agent to perform the action to transition the agent to the next state.

18. The method of claim 17, wherein the agent is a robotic agent, and wherein the current state of the robotic agent includes one or more instances of vision data captured using a vision component of the robot and/or one or more instances of robot state data capturing one or more parameters indicating the state of the robotic agent.

19. The method of claim 17, wherein the agent is a software agent, and wherein the current state of the agent includes a sequence state data capturing the state of the software agent.

* * * * *